United States Patent
Binns et al.

(10) Patent No.: US 7,392,201 B1
(45) Date of Patent: Jun. 24, 2008

(54) INSURANCE CLAIM FORECASTING SYSTEM

(75) Inventors: Gregory S. Binns, Wilmette, IL (US); Mark Stuart Blumberg, Oakland, CA (US)

(73) Assignee: TruRisk, LLC, Lake Forest, IL (US)

( * ) Notice: Subject to any disclaimer, the term of this patent is extended or adjusted under 35 U.S.C. 154(b) by 1498 days.

(21) Appl. No.: 09/861,379

(22) Filed: May 18, 2001

Related U.S. Application Data

(60) Provisional application No. 60/267,131, filed on Feb. 7, 2001, provisional application No. 60/249,060, filed on Nov. 15, 2000.

(51) Int. Cl.
G06Q 40/00 (2006.01)
G06Q 50/00 (2006.01)
G06F 19/00 (2006.01)
A61B 5/00 (2006.01)

(52) U.S. Cl. .................. 705/4; 705/2; 705/3; 600/300
(58) Field of Classification Search ............. 705/4
See application file for complete search history.

(56) References Cited

U.S. PATENT DOCUMENTS

| | | | |
|---|---|---|---|
| 4,667,292 A | 5/1987 | Mohlenbrock et al. | |
| 4,975,840 A * | 12/1990 | DeTore et al. ............ | 705/4 |
| 5,018,067 A | 5/1991 | Mohlenbrock et al. | |
| 5,544,044 A | 8/1996 | Leatherman | |
| 5,557,514 A | 9/1996 | Seare et al. | |
| 5,613,072 A * | 3/1997 | Hammond et al. ......... | 705/4 |
| 5,652,842 A | 7/1997 | Siegrist, Jr. et al. | |
| 5,712,984 A | 1/1998 | Hammond et al. | |
| 5,724,379 A | 3/1998 | Perkins et al. | |
| 5,809,478 A * | 9/1998 | Greco et al. ............ | 705/4 |
| 5,835,897 A | 11/1998 | Dang | |
| 5,873,066 A | 2/1999 | Underwood et al. | |
| 5,893,072 A | 4/1999 | Zizzamia | |

(Continued)

OTHER PUBLICATIONS

Anonymous, "Medical Scientists Inc. Selects MEDSTAT for 3 Year Data Agreement." Jul. 26, 2000, PRNewswire, p. 7992.*

(Continued)

*Primary Examiner*—Joseph Thomas
*Assistant Examiner*—Rachel L Porter
(74) *Attorney, Agent, or Firm*—Welsh & Katz, Ltd.

(57) ABSTRACT

A computer-implemented process of developing a person-level cost model for forecasting future costs attributable to claims from members of a book of business, where person-level data are available for a substantial portion of the members of the book of business for an actual underwriting period, and the forecast of interest is for a policy period is disclosed. The process uses development universe data comprising person-level enrollment data, historical base period health care claims data and historical next period claim amount data for a statistically meaningful number of individuals. The process also provides at least one claim-based risk factor for each historical base period claim based on the claim code associated with the health care claim and provides at least one enrollment-based risk factor based on the enrollment data. The process also develops a cost forecasting model by capturing the predictive ability of the main effects and interactions of claim based risk factors and enrollment-based risk factors, with the development universe data through the application of an interaction capturing technique to the development universe data.

47 Claims, 13 Drawing Sheets

U.S. PATENT DOCUMENTS

| | | | |
|---|---|---|---|
| 5,918,208 A | | 6/1999 | Javitt |
| 5,970,464 A | | 10/1999 | Apte et al. |
| 5,976,082 A | * | 11/1999 | Wong et al. ............... 600/300 |
| 6,061,657 A | | 5/2000 | Whiting-O'Keefe |
| 6,078,890 A | | 6/2000 | Mangin et al. |
| 6,223,164 B1 | * | 4/2001 | Seare et al. ................. 705/2 |

OTHER PUBLICATIONS

List of Diagnosis Related Groups (DRGs), FY 1995; http://www.hcfa.gov/stats/drg95dsc.xls.

Development & Evaluation of Clinical Risk Groups (CRGs), R.F. Averill, et al., HIS Research Report Sep. 1999, http://www.hcfa.gov/stats/ss95both.xls.

Maryland Mortality for Non-Elective Surgery: A Prototype Ramo[1] System, Mark S. Blumberg, M.D., May 6, 1987.

A Comparative Analysis of Methods of Health Risk Assessment Final Report, D.L. Dunn, et al., Society of Actuaries, Dec. 21, 1995.

The Cost of Health Conditions in a Health Maintenance Organization, G. Thomas Ray, et al., *Medical Care Research and Review*, vol. 57 No. 1, (Mar. 2000), pp. 92-109.

Potentials and Limitations of Database Research, M.S. Blumberg, *Statistics in Medicine*, vol. 10, No. 4, p. 637.

Disaggregated Annual Health Services Expenditures: Their Predictability and Role as Predictors, Annemarie V. Wouters, Health Services Research, V. 26, pp. 247-272, Jun. 1991.

Extracting More Profits from Small Group Renewals presentation to Conseco Health, G. Binns, et al., Dec. 7, 1999.

Mining the Data for Smarter Renewals presentation to Fortis, G. Binns, Nov. 15, 1999.

* cited by examiner

FIG. 1: OVERVIEW OF PROCESS FOR PRODUCING THE PRODUCTS
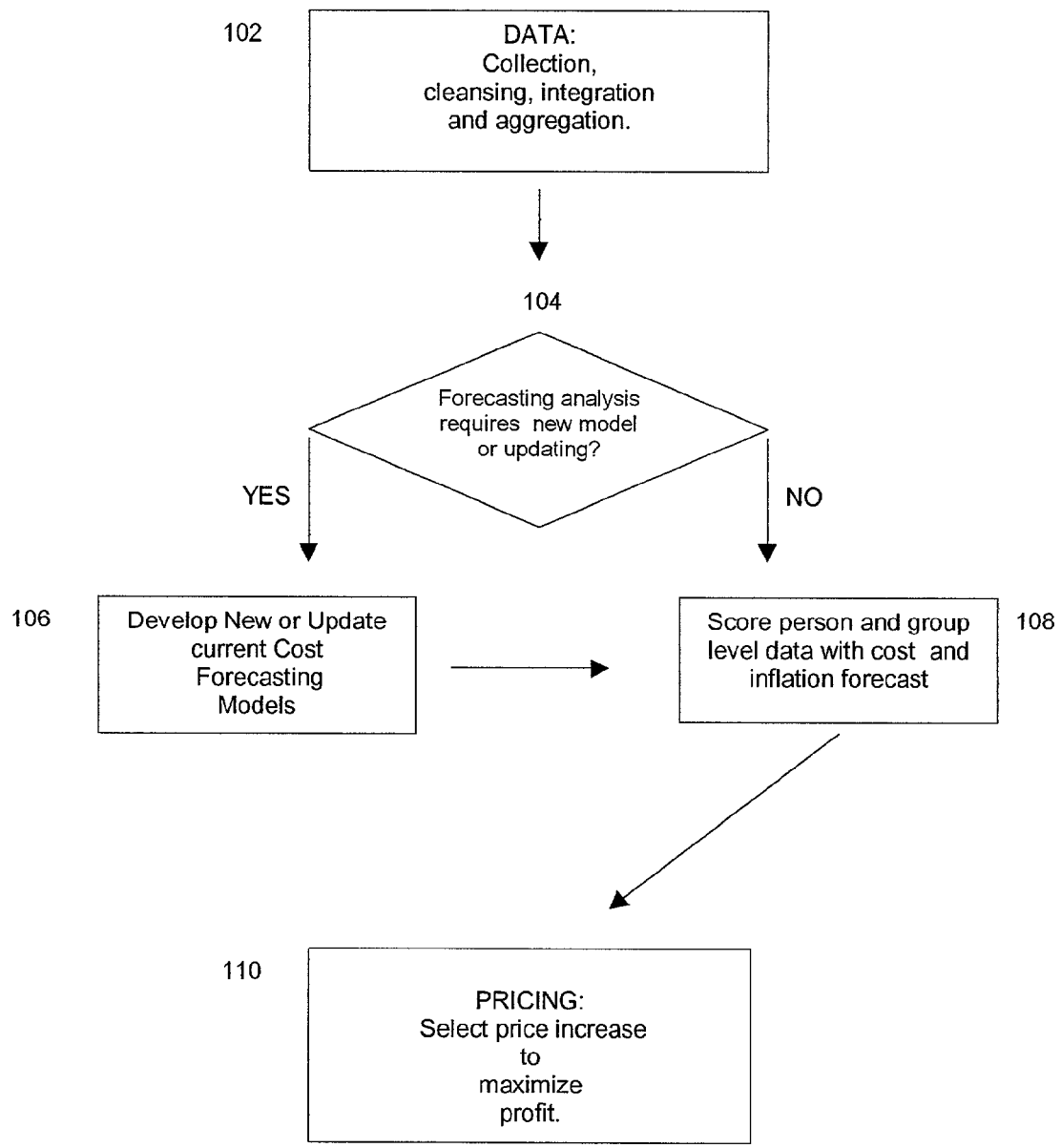

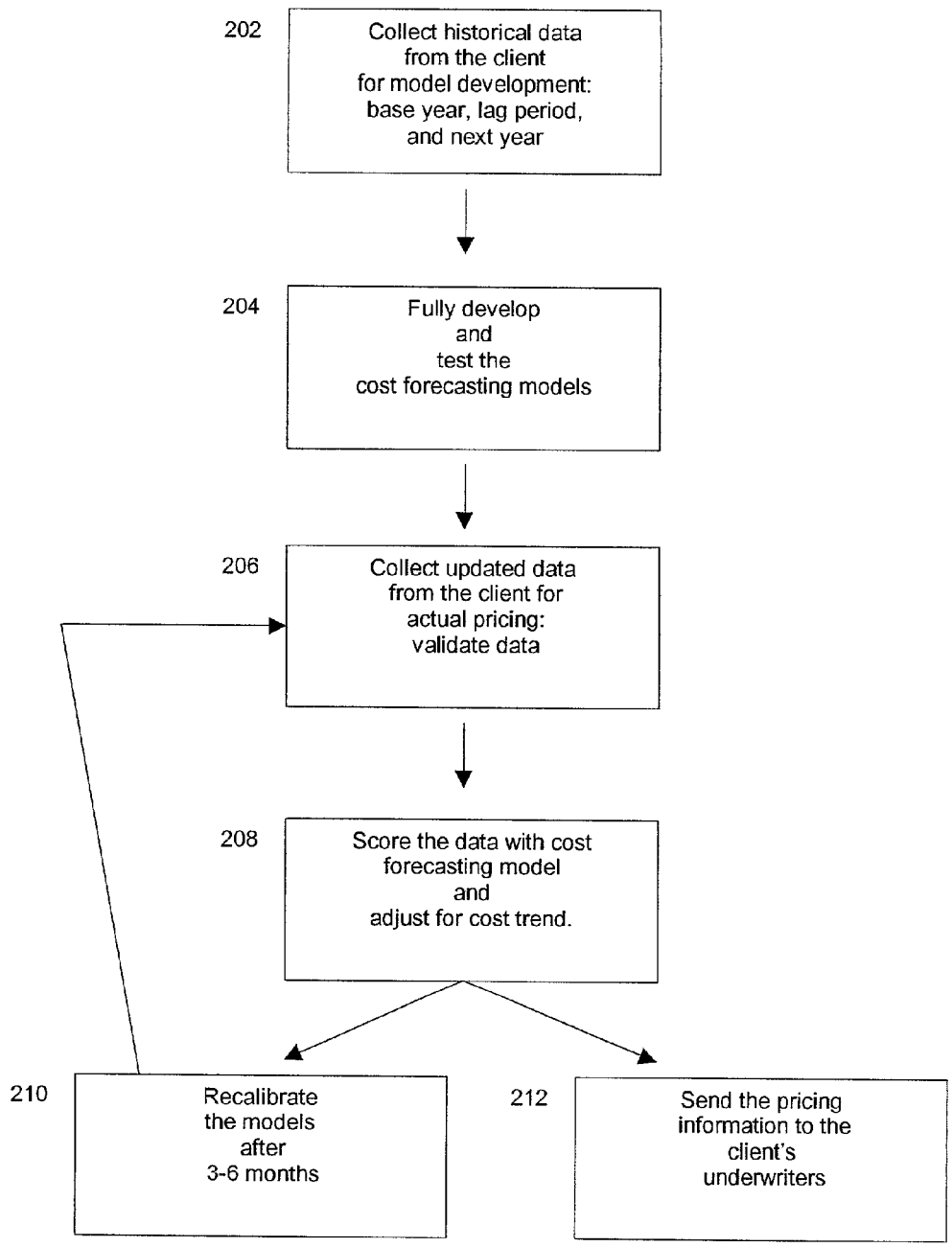
FIG. 2: Overview of information flows when performing service bureau work for a client.

FIG. 3: Overview of information flows when installing software, for cost forecasting and pricing, into the clients operating system
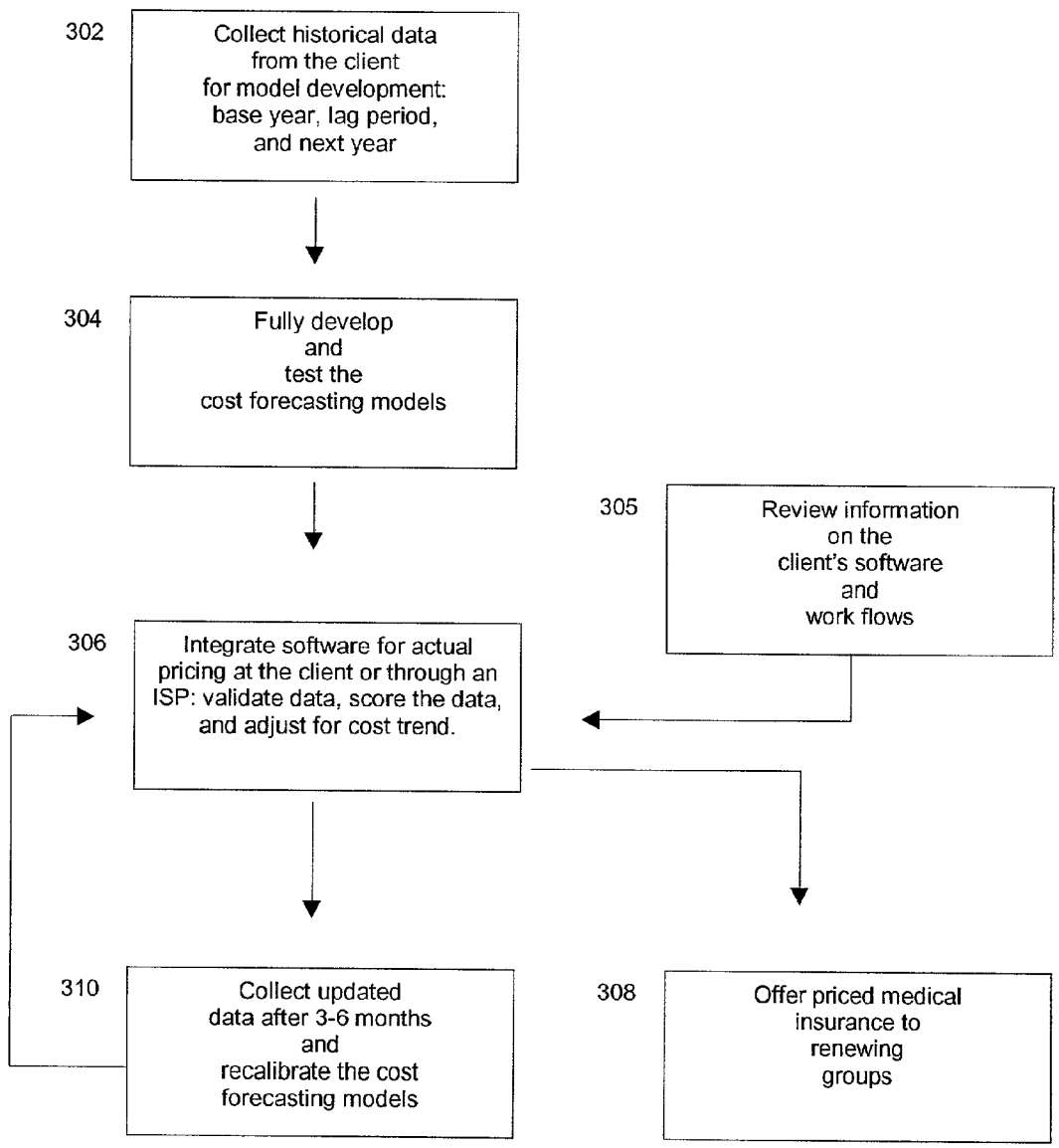

FIG. 4: Data Collection
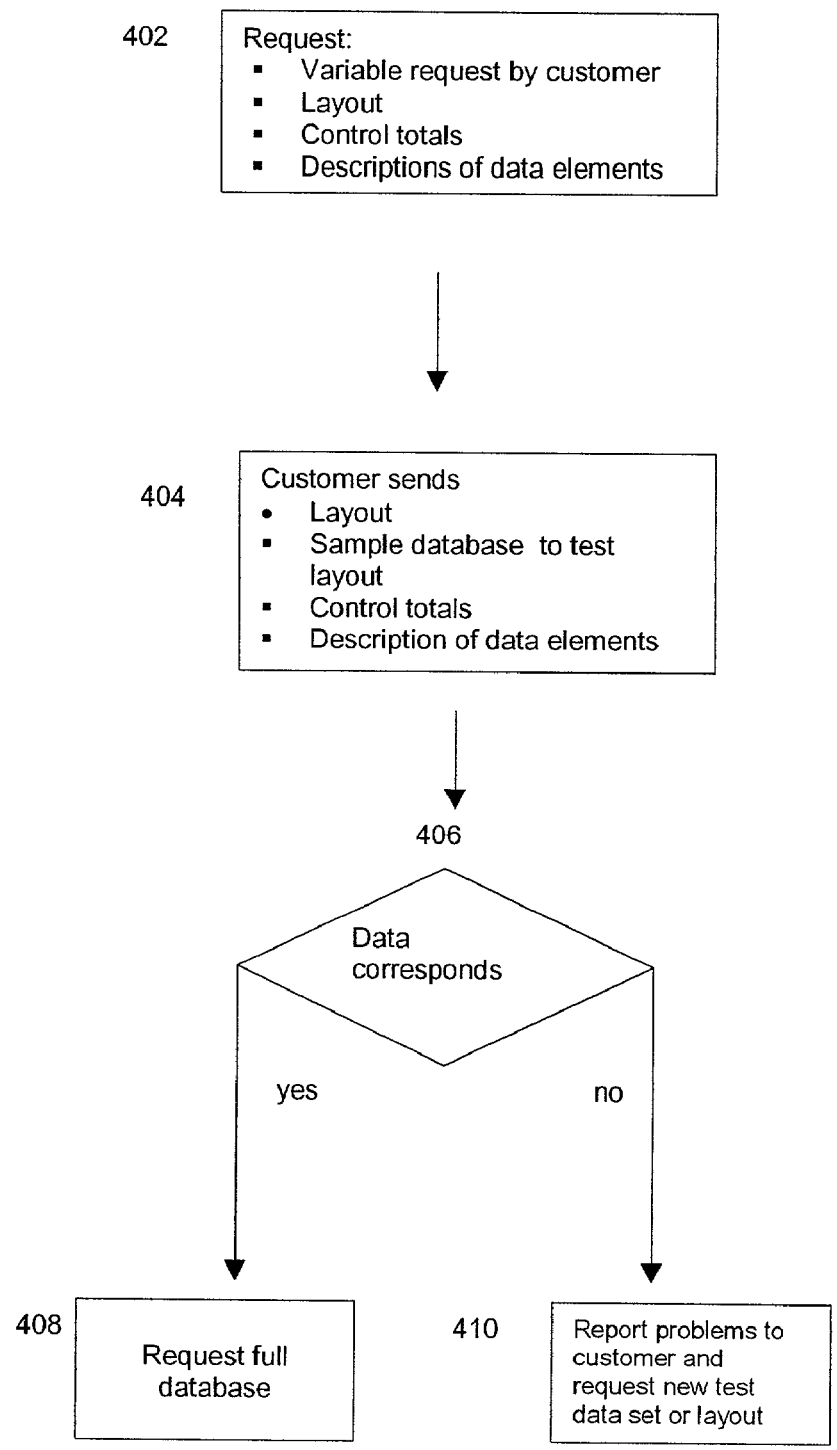

FIG. 5: Define Time Periods for Cost Forecasting Analysis

502 — Develop list of first renewal dates by group for price setting using this product.

504 — Estimate Lag Period.

506 — Calculate earliest incurred date for beginning of base year through the last paid date for the end of the next year used for model development.

508 — Define cost forecasting model development time period and cost forecasting for actual pricing time period.

FIG. 6: Initial Data Preparation
(Standard for Claims and Enrollment Data Elements)
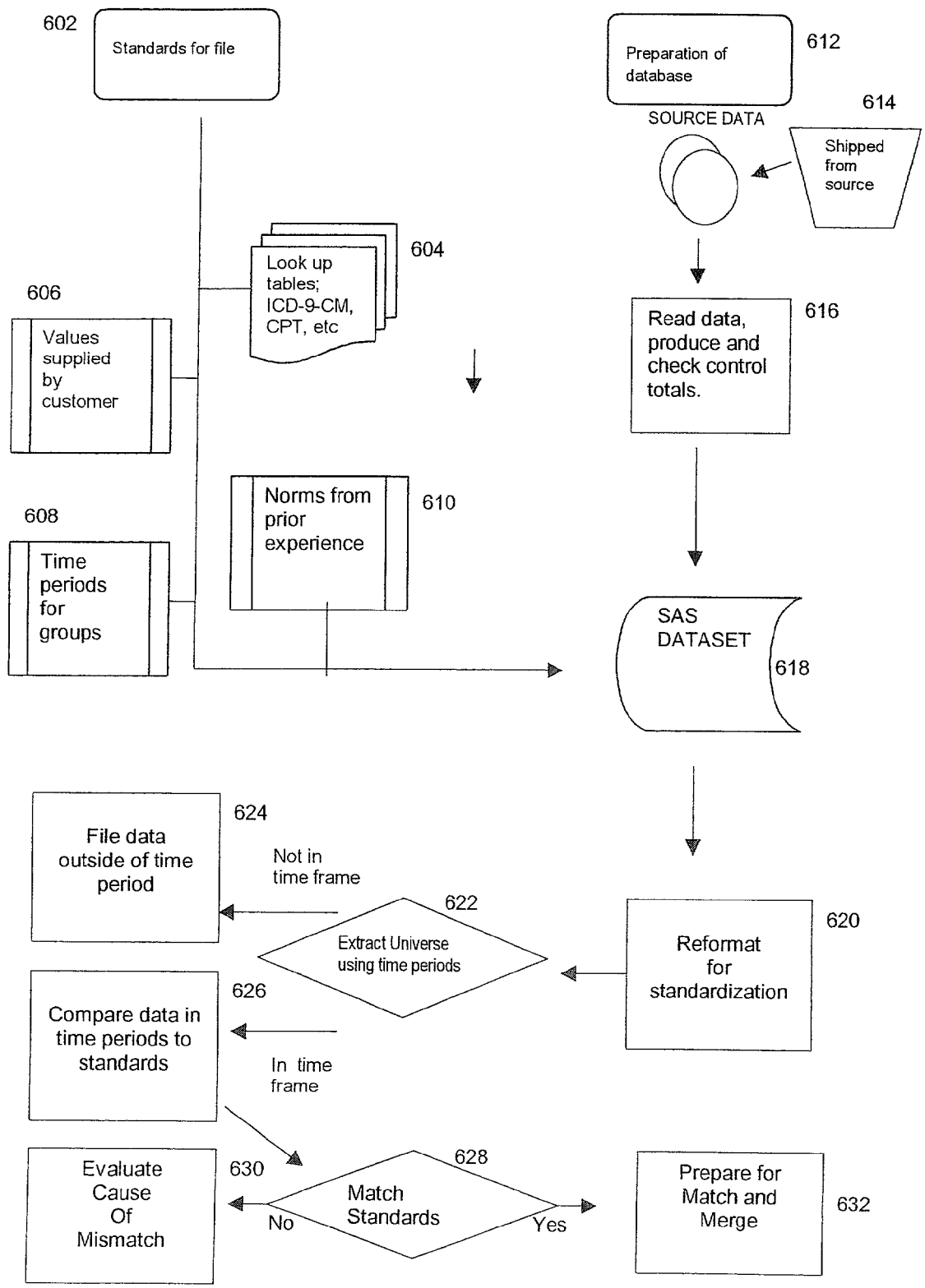

FIG. 7: Match and Merge Enrollment and Claims Data
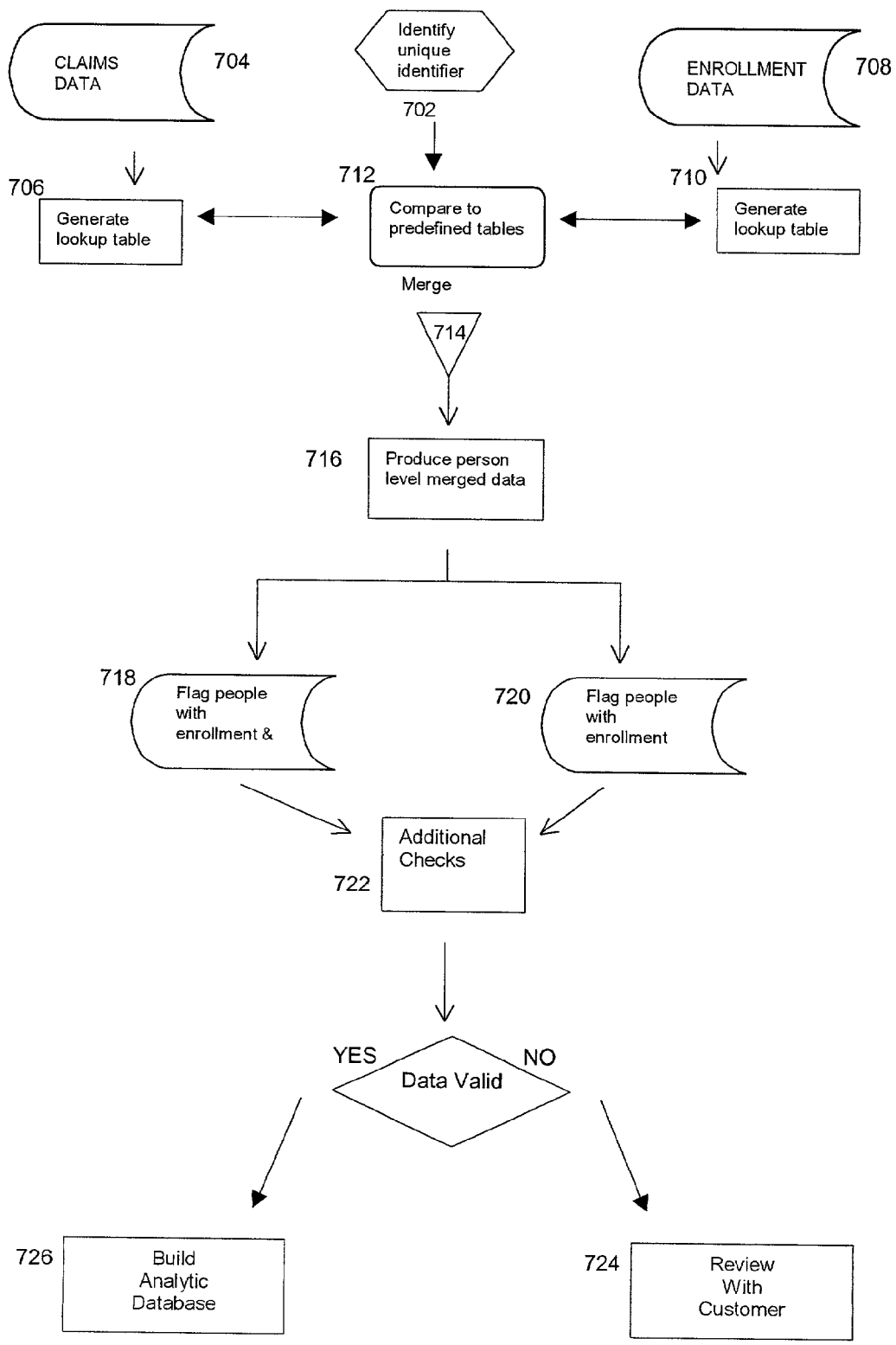

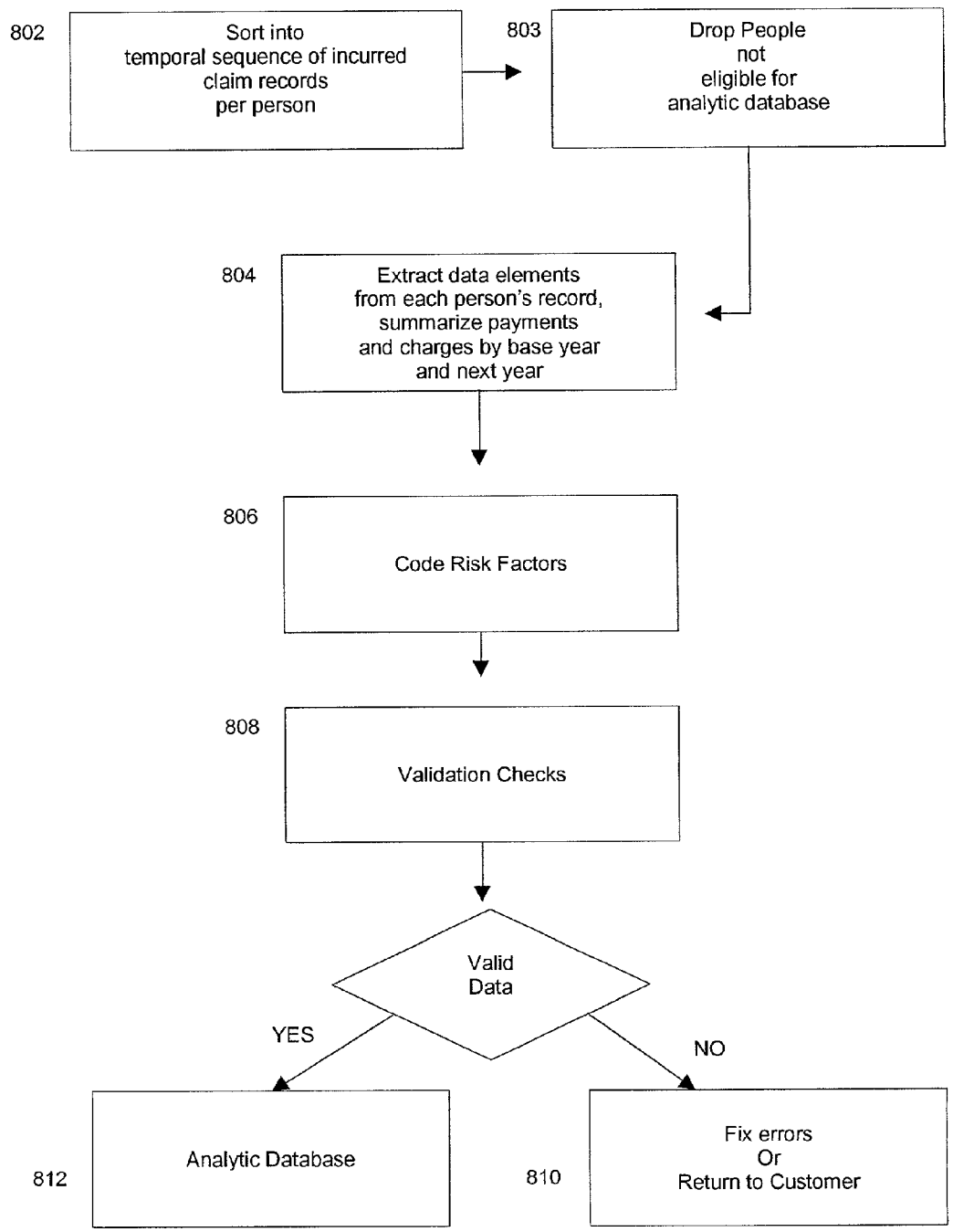
FIG. 8: Aggregation of claims, risk factor coding, and additional data validation.

FIG. 9: Developing Cost Forecasting Models, Winsorized Data
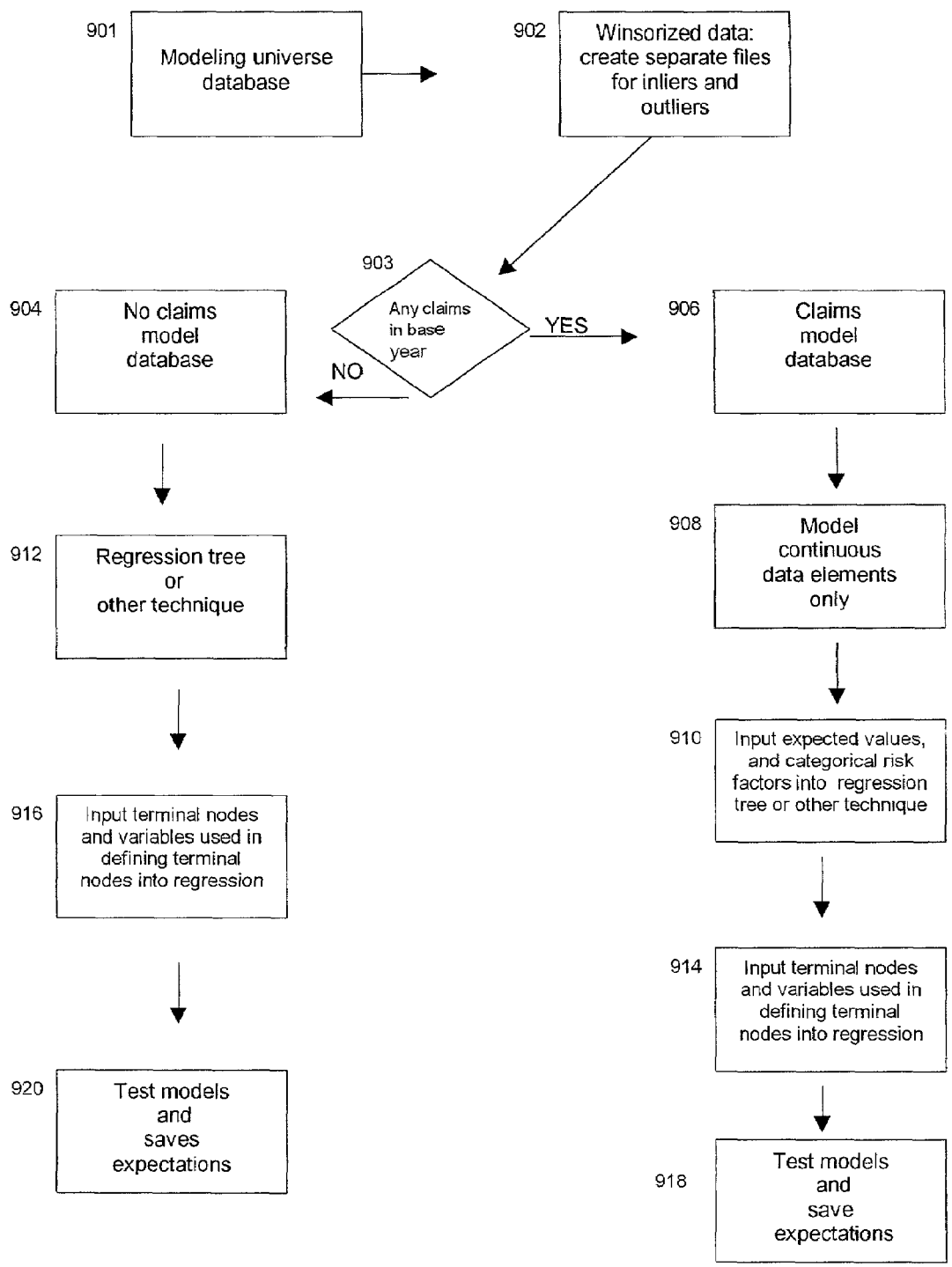

FIG. 10: Developing Cost Forecasting Models, Outlier Data
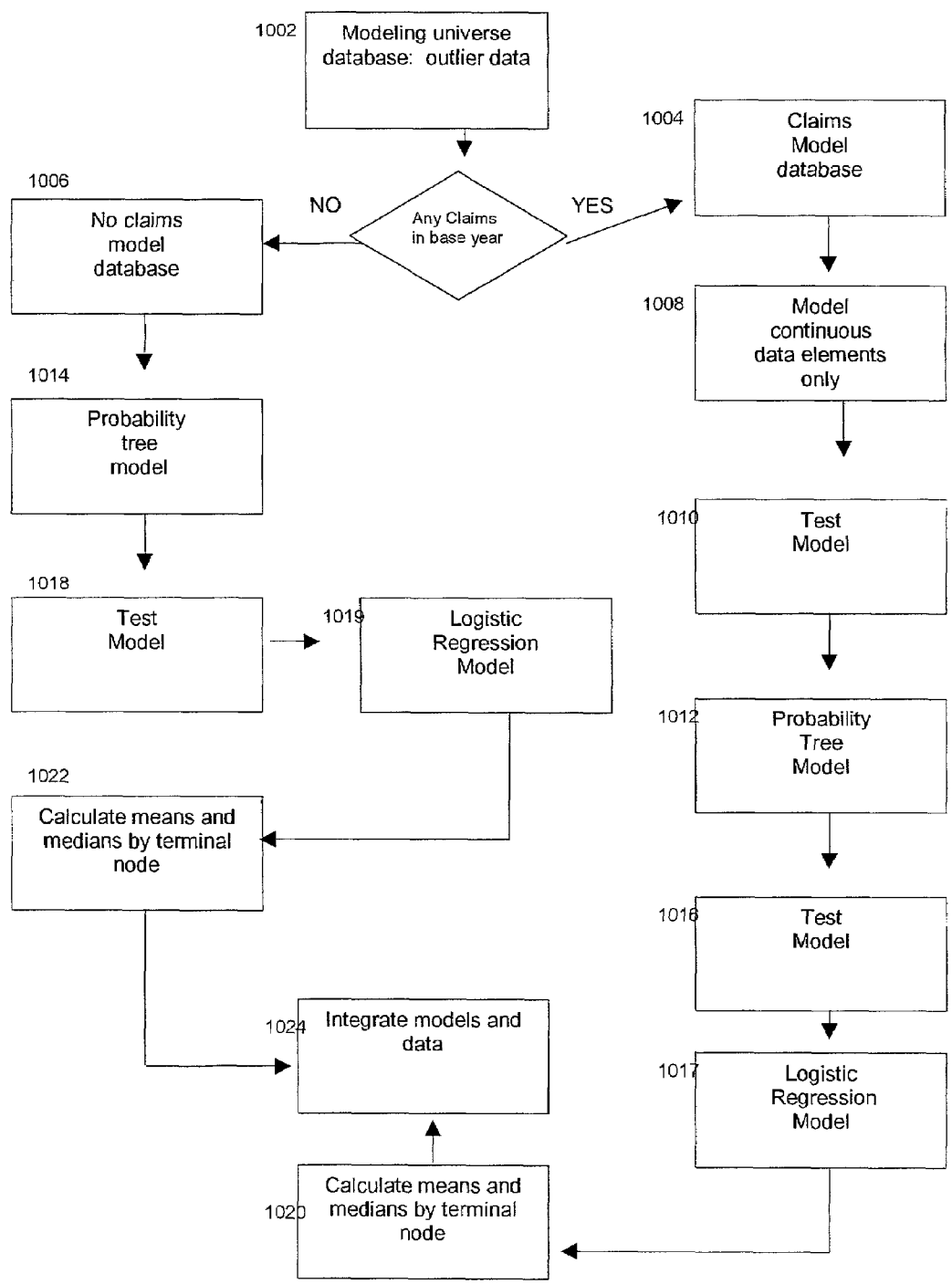

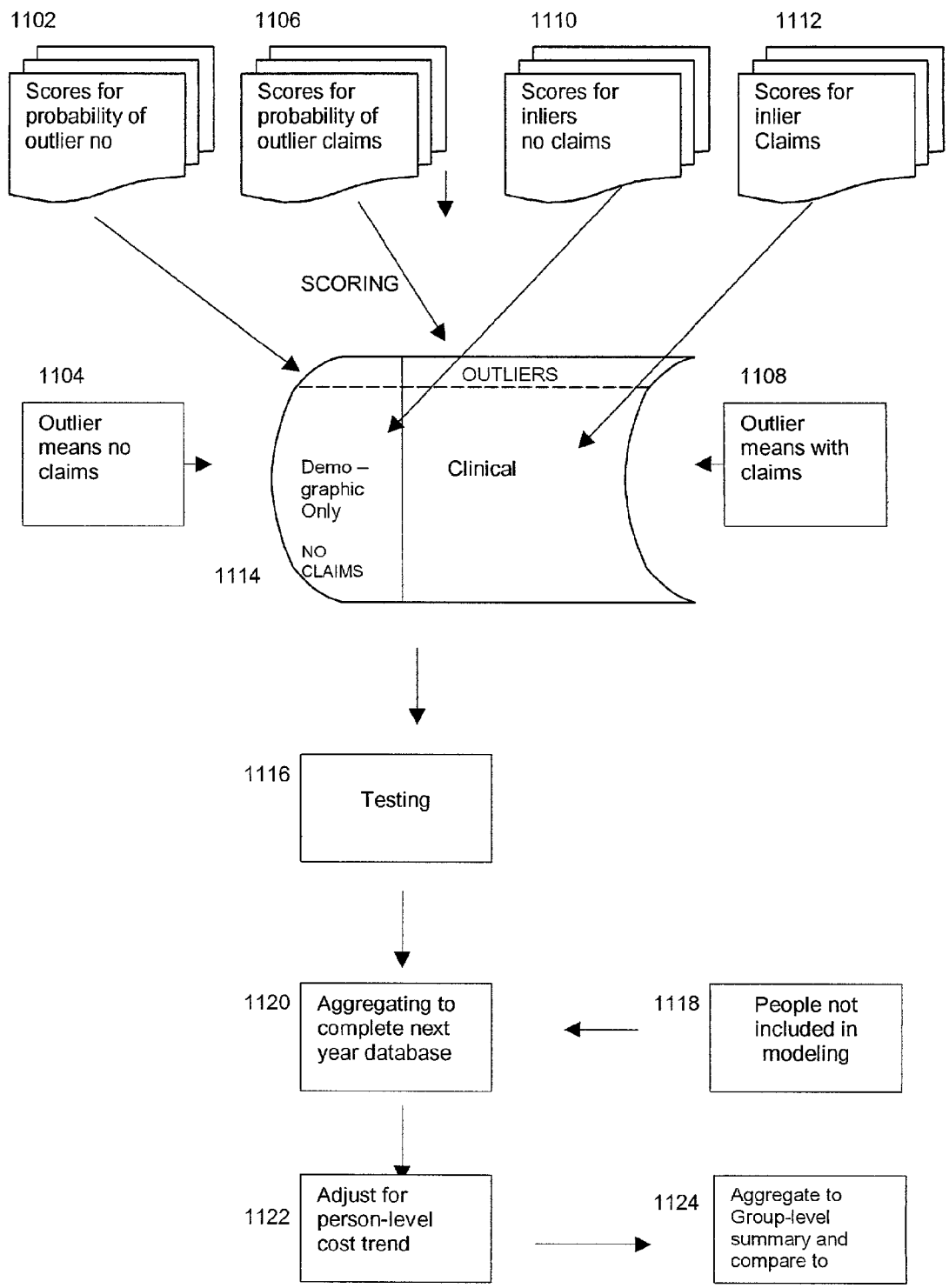
FIG. 11: Scoring, Testing and integrating the data

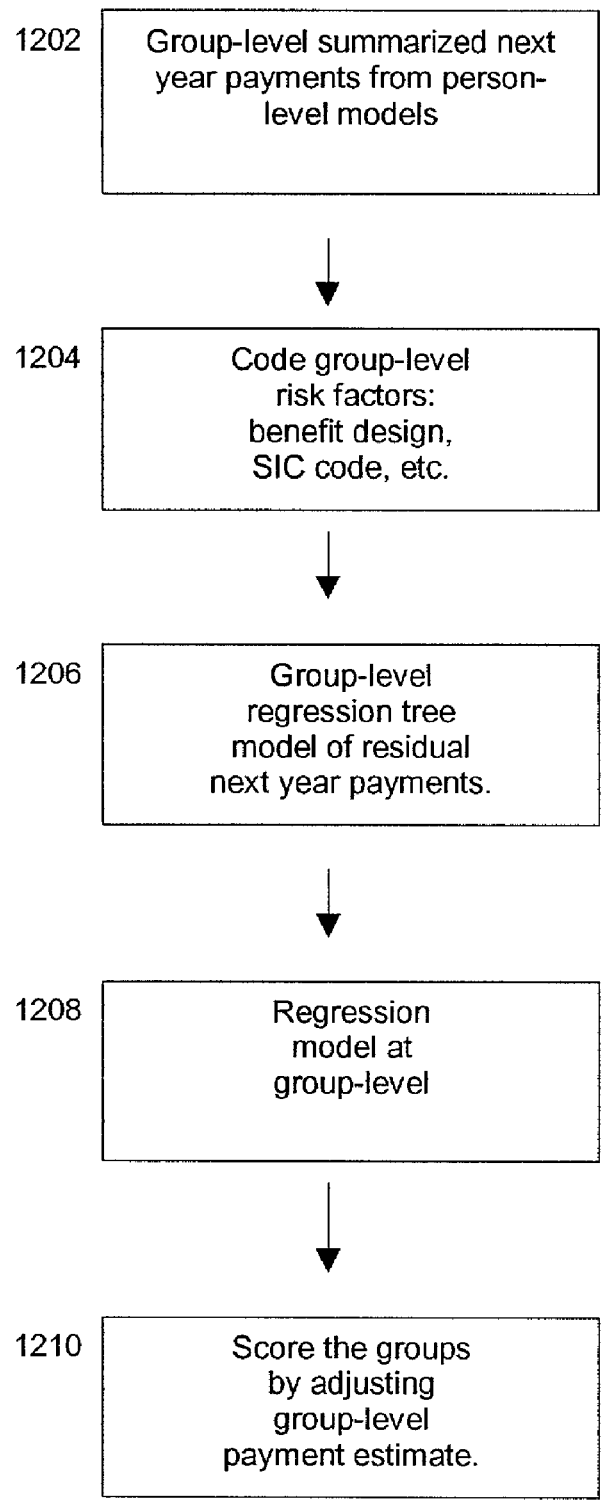
FIG. 12: Group-level models and adjustments

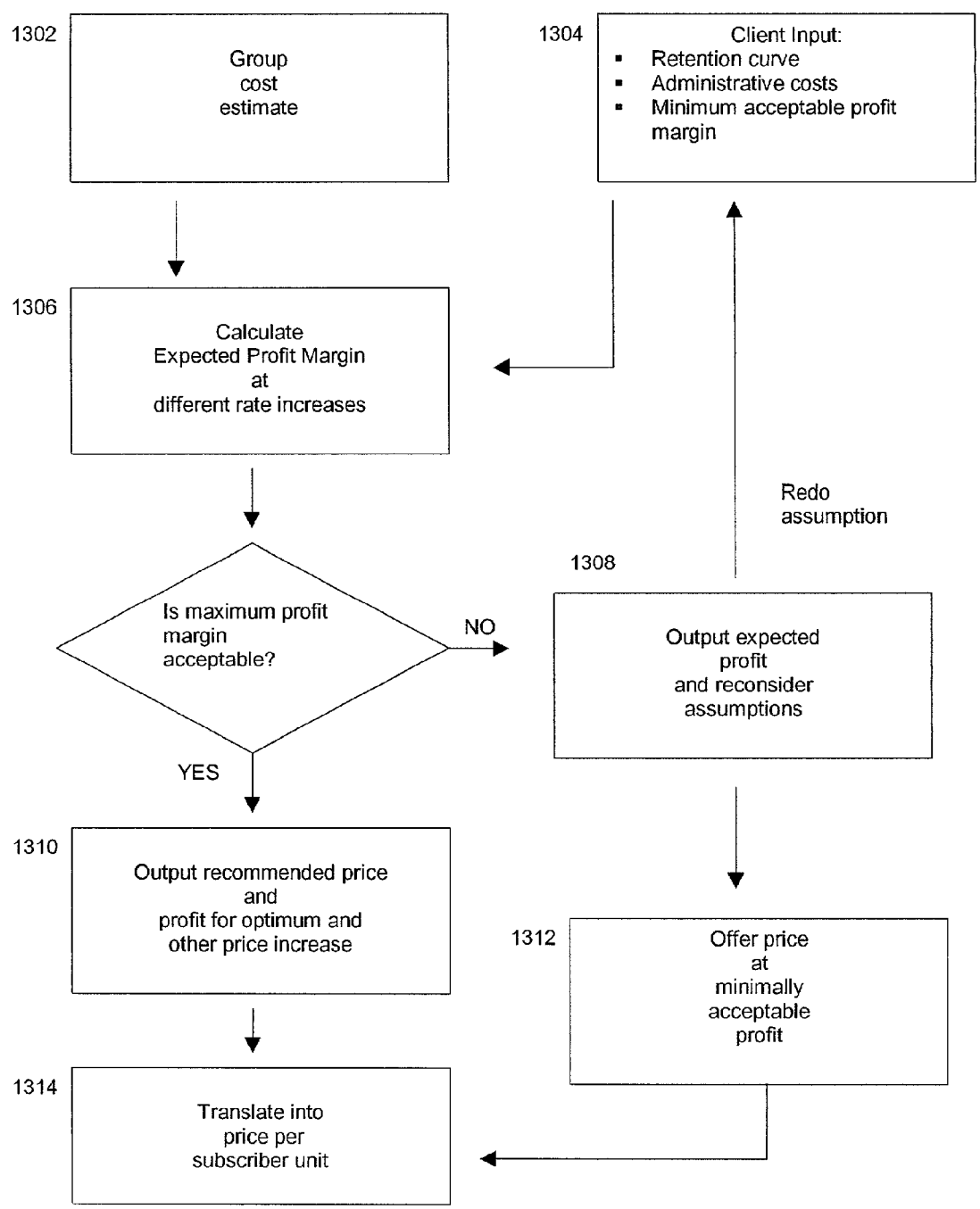
FIG. 13: Price Optimization

INSURANCE CLAIM FORECASTING SYSTEM

CROSS-REFERENCE TO RELATED APPLICATIONS

This application is based on provisional applications 60/249,060, filed Nov. 15, 2000, and 60/267,131 filed Feb. 7, 2001, which are incorporated by reference herein.

REFERENCE TO PROGRAM LISTINGS

A computer program listing appendix has been submitted on compact disc for this disclosure. The material on that compact disc is incorporated by reference herein. The compact disc was filed with 2 copies, and contains the following files with:

| NAME OF FILE | DATE OF CREATION | SIZE IN BYTES |
|---|---|---|
| APPENDIX.TXT | May 14, 2001 | 281,991 |

The names above are the names of the files on the compact disc, the dates are the dates the files were created on the compact disk, and the size in bytes is the size of the file. Please note that there is a glossary of terms included at the end of the Background section.

BACKGROUND OF THE INVENTION

This invention pertains to health, disability and life insurance systems, particularly including processing data (in the business of health insurance) for estimating future costs or liability and setting optimal pricing. For convenience, we call one embodiment of our invention More Accurate Predictions for Health Insurance Premiums or MAP4HIP.

Group health insurance is typically priced through a series of steps. Historical claims costs are calculated by summing the costs of insured individuals. Actuaries estimate what the general cost inflation trend will be next period. If an insured group is large enough to have credible experience (historical costs), the inflation trend may be applied to the historical claims experience to produce an estimate of the expected claims for next period. A profit margin and administrative costs are added to the expected group claims costs to produce the so-called "experience rate". An underwriter reviews the group's experience and adjusts the cost and profit margin-based price depending on special circumstances and competitive pressure. The standard practice is to use group-level data for estimating costs and setting prices except for very small groups, individual policies or specific medical stop loss insurance. Information on the insured's (i.e., individual's) medical conditions is typically not used when group-level data are used for underwriting and pricing the group's aggregate cost forecast.

The current standard practice for estimating future health care costs for groups of 50 or more employees plus their dependents uses one of two methods or is a combination of those methods. If the group is large enough to have credible, stable experience, the historical costs are assumed to be the best estimate of next period's costs after a cost trend factor for inflation has been included. If the group is too small to have credible historical costs, many groups are combined together and averaged so that a stable demographic look-up table of historical average costs by age group by gender by family size can be developed and used as a weighting mechanism for estimating the expected future costs for non-credible groups. Cost trend factors for inflation are then applied. If a group does not have completely credible or non-credible experience, a blended average of its experience and a demographic look-up table forecast is used. These standard actuarial methods do not account for person-level trends in historical costs nor medical information about the person.

Small groups (i.e., 50 or fewer employees plus their dependents) or individual medical policies may use medical questionnaires from initial enrollment applications as input to an underwriter for estimating next period's group-level costs. Manual underwriting is expensive due to the labor intensity and is prone to variability among underwriters as their experience varies.

Some state Medicaid HMO programs (e.g., Colorado and Maryland) and federal Medicare HMO programs are using statistical algorithms that make person-level cost forecasts based on diagnoses from the computerized medical bills and demographic factors. These "risk adjustment" methods do not use procedures or historical person-level costs as the governments do not want incentives for increased utilization of services and spending more money. The governments' intent for HMO payments or managed care is to make payments proportional to the insured populations need for care based on their health conditions but not on prior care. However, historical cost is the single best predictor of future medical cost for credible groups. Not using it as part of the forecasting method decreases the accuracy of the forecast.

Some medical insurance companies may be using such "risk adjustment" algorithms used by Medicare, Medicaid and others intended for managed care cost forecasting or payment allocation. However, the prospective use of historical costs, types of services and procedures as well as diagnoses and demographics, as well as combinations of these variables, to produce more accurate cost forecasts than "risk adjustment" algorithms using only diagnoses and demographic factors, would be desirable.

There are person-level diagnosis and procedure models that measure the efficiency of medical practices (i.e., costs of care given the patient's conditions). These models are typically concurrent or retrospective in nature and not prospective. Symmetry's ETGs are a good example of this class of models. It lacks cost experience as a predictor since that is intended as the dependent variable. It also may limit use of demographic variables. Forecasting models would be desirable which are prospective and not designed for concurrent or retrospective analysis. The methods of the present invention can be applied to concurrent data to develop models for efficiency analysis, as will be described.

Stop loss health (or medical) insurance is typically purchased by self-insured employers that wish to limit their medical expense exposure. The most common form of medical stop loss insurance is known as "specific stop loss" insurance which is a high deductible (usually $25,000 to $100,000) insurance policy per insured person. Specific stop loss medical insurance is designed to protect the employer or other payer from large catastrophic medical expenses such as those incurred for liver transplants or care for neonates with major repairable congenital anomalies. The standard method for underwriting specific stop loss medical insurance uses a demographic look-up table to estimate costs for individuals whose medical expenses were under 50% of the deductible in the previous year. If an insured's medical expenses were over a predetermined amount, such as over 50% of the specific deductible, the insured's medical records are reviewed manually by an underwriter, and next year's costs are estimated by the underwriter or a doctor or nurse using their experience and expert opinion. Manual medical underwriting for specific stop loss has the same problems as manual underwriting for small group medical insurance; it is expensive and prone to underwriter variability.

Frequently, "aggregate stop loss medical insurance" coverage is also purchased by the employer. Aggregate coverage (exclusive of specific payments) means that the insurer will pay the employer's or other payer's medical cost obligations for a covered group if those costs exceed an agreed upon amount (i.e., an "attachment point"). The attachment point is typically defined as 125% of the group's expected cost in the insured period. The industry standard for calculating the expected cost is substantially the same method as used for fully insured plans. In other words, if the group is large enough to have completely credible experience, the last year's experience is modified by forecast inflation and increased by 25% to produce the 125% attachment point. If the group's experience is partially credible, then a weighted combination of experience and demographic look-up table model is used with an inflation forecast and increased 25% to calculate the 125% attachment point. When the group is too small to have credible experience, the demographic look-up table model is used as the starting point then trended inflation increased by 25% is used to calculate the 125% attachment point. Aggregate only medical stop loss insurance has been recently offered by one company (Cairnstone) to credible groups, and we believe that it uses group-level experience plus trended inflation to estimate future costs. Price is usually determined by competitive pressure but the inventors are not familiar with proprietary techniques used by the insurers.

We are including a glossary of terms that are used in describing the invention so that we are precise in our description. Additionally, SAS computer code and CART modeling language will be included to provide concrete examples of the implementation of the process or products. The software Appendix found on the compact disc filed with the present disclosure contains computer code (minus copyrighted formats) of a simpler embodiment of the invention. That code is in SAS and S Plus and the regression tree used is RPART. Details are provided for the fully insured renewal product. The aggregate only stop loss product uses the same steps for cost estimation. The short term disability, long term disability and life insurance products use the same techniques for forecasting but the dependent variables are changed to reflect the insurance type.

GLOSSARY OF TERMS

1. Aggregate only stop loss health insurance—A health insurance product for self funded employers that want to cap their maximum liability. The aggregate only policy will pay off costs above an agreed upon limit (i.e., the attachment point). Usually, the attachment point is 125% of expected costs but it could be 110% or some other amount. The expected costs are estimated using an embodiment of this invention or using standard actuarial methods. Aggregate only stop loss does not include specific stop loss. However, specifics can be combined with aggregate stop loss. In that case the specific payments are not included in the costs counted against the aggregate attachment point.

2. Base Period—A period of typically 12 consecutive months prior to the lag period during which services were provided to some enrollees and reflected by claims entered in a computer file. In practice, it may be more or less than 12 months. Risk factors are coded on data from the base period. These data are used to forecast the next period costs. In other words, these data are used to calculate the predictors for the development model and are not used for underwriting actual health insurance policies.

3. Book of Business—The insurance of a given type (e.g., small group, individual, large group) for all persons covered by an insurer at a point in time or during a specified period. An insurer may have multiple books of business.

4. Bias Test—A comparison of observed to predicted values from a model. The totals of both these values are equal to the total population which served as the standard in the preparation of the model. Bias tests determine whether or not there is any meaningful systematic disparity between observed and predicted cost when persons are sorted by predicted values, age or family composition or other characteristics. Disparities are considered as bias which better models eliminate or reduce. Another related measures sorts by the actual rather than the predicted values and is a measure of the accuracy of the forecasts.

5. Candidate Predictor Variable—An array of variables derived from the CI (client insurer) database and available to the statistical software which selects those which are most predictive of the dependent variable (e.g., by stepwise OLS, CART regression trees).

6. Claim amount: This is the total cost or payments made by the insurer.

7. Claim codes: These include ICD-9-CM diagnosis and procedures, CPT codes, National Drug Codes and other standardized coding systems values such as SNOWMED codes.

8. Claim-based risk factors: These are risk factors derived from the claim code, claim amount and transformations of the claim amount, type and place of services, provider type, units of service and other information contained on a health care claim. These risk factors are present in either the base or underwriting period.

9. Clinical risk factors: Risk factors derived from the claim codes, type and place of service and provider type but not solely from the claim amount.

10. Client Insurer (CI)—The insurance entity for which the invention is to be applied.

11. Concurrent Cost Models—Used synonymously with Retrospective Cost Models and defined elsewhere.

12. Costs of health care—May be defined as either of the following. Measured in dollars (usually per person per day in this application)
 a. Claims—total bills for care submitted to the insurer for reimbursement
 b. Payments—The amounts actually paid by the insurer. Payments are always less than the claims due to deductibles, benefits and non-covered services.

13. Cost Inflation—Used synonymously with cost trend. The secular trend in cost per person for health care due to changes in practice patterns and price per service. Does not usually consider changes in a population's health care needs which are usually minimal in the short run. Differs from pure price inflation such as that measured in the consumer price index (CPI).

14. Credibility—The degree to which this experience may confidently be used as the basis for future rates relates to its credibility.

15. Demographic look-up table—This is a method used by actuaries to estimate group-level costs when the group is too small to have credible experience. Average costs are calculated across a large pool of groups and averages are calculated by cell in a table of age by sex by family composition or other similar demographics. The appropriate cell amounts are applied to each person or employee in a non credible group and summed to calculate its expected cost.

16. Dependent Measure—The dependent measure is the forecast of the model through application of the interaction capturing technique. A transformation may be applied to the dependent measure to calculate the claim amount (e.g., multiplying a probability by an average cost). For health insurance and medical stop loss insurance the dependent measure is the future cost of health care for the population which comprises the CI book of business at the time the rates are to be quoted. For short-term disability the dependent measure is disability days. For long term disability and life insurance the dependent variable is the probability of the event.

17. Enrollment-based risk factors—These are risk factors that are derived from the enrollment information only such as age, sex, relationship to the enrollee, length of enrollment, geographic locale and type of coverage and does not include claim information or claim amount. The employees salary, disability coverage terms and term life insurance coverage terms may be included in the enrollment file also.

18. Experience model—This is a method used by actuaries for estimating cost next year at the group-level. If the group is deemed credible, the last year's cost (or experience) is considered to be the best estimate of next year's cost. A cost trend is added to account for medical inflation for next year's cost.

19. Group—A group is a collection of one or more people that are covered by one insurance policy. A traditional group is a collection of employees and their dependents that work for an employer at a location. A group can be an individual or a family by purchasing an "individual" health insurance policy where the remaining immediate family may also be covered by the policy.

20. Health Insurance—Insurance for the array of benefits covered by the health insurance policies of the client insurance company or a self-insured company including hospital, surgical and medical care plus drug benefits for some plans. Medical insurance is used as a synonym.

21. Hybrid Tree Analysis—The use of regression trees (or other analytic method output) as input to other regression models such as OLS, median and logistic regression or neural networks. Additionally, a model's output (e.g., regression or neural network) may be used as input into the regression or probability tre.

22. Interaction Capturing Technique—A mathematical and logical transformation of independent variables that predicts a response or dependent variable. The interaction capturing technique includes main effects, interaction effects and possibly time series effects. Statistical techniques that are examples of interaction capturing techniques include, but are not limited to, ANOVA, regression methods (e.g., linear, logistic, shrinkage, robust, ridge), regression trees, moving averages and autoregressive moving averages, look-up tables, means, probability models, clustering algorithms and many other methods. Data mining techniques that are examples of interaction capturing techniques include, but are not limited to, decision trees, rule induction, genetic algorithms, neural networks, nearest neighbor and other data mining methods.

23. Lag Period—A period between the base period and the next period or the underwriting and policy period which is required because of delays in filing claims, preparing or revising model weights, calculating premium rates and submitting them to insured groups in a timely way.

24. MAP 4 HIP—This is an acronym of More Accurate Predictions for Health Insurance Premiums which in turn is a brief title for our invention for its application to health insurance.

25. Next Period—Typically a 12 consecutive month period subsequent to the base period and the lag period that contains the data that comprise the dependent variable used in the development model. Actual insurance policies are not written for this period but are underwritten for the policy period.

26. Policy Period—Typically a 12 consecutive month period subsequent to the underwriting period and the lag period that contains the data that comprise the actual cost borne by the insurer. These costs are forecast using the application of the development model to the data from the underwriting period with appropriate adjustments made for assumptions about inflation.

27. Prospective Cost Models—The candidate predictor variables relate to a time period which precedes the dependent variable.

28. Retrospective Cost Models—The candidate predictor variables relate to the same time period as the dependent variable.

29. Specific stop loss health insurance—A health insurance coverage for self-funded employers or other payor that has a very high deductible per person. Usually the deductible is at least $10,000 and may be as high as $500,000 per person. Typically the deductible is between $25,000 and $100,000 per person and is meant to pay for strophic care.

30. Standard population—The cases in the data set which are used to select predictor variables and to weight them by their relation to the dependent variable. For this invention, the cases are an insured population.

31. Subscriber unit—The family unit that health insurance premium is charged by. For example, the simplest are two units: 1) a single person and 2) two or more people. Single person, married couple and three or more people is a common classification but more detailed versions are also used. The subscriber is the employee.

32. Third Party Administration or TPA—A company that processes the health insurance claims for a self funded employer. The TPA may be part of an insurance company or not.

33. Underwriting Period—A period of typically 12 consecutive months prior to the lag period during which services were provided to some enrollees and reflected by claims entered in a computer file. In practice, it may be more or less than 12 months. Risk factors are coded on data from the underwriting period. These data are used to forecast the policy period costs. In other words, these data are used to calculate the predictors for the model that is used for underwriting actual health insurance policies.

34. Winsorize—Data are Winsorized if the most extreme observations on one or both ends of the ordered samples are replaced by the nearest retained observation. Our cost distributions have no low cost outliers and hence Winsorization is applied only to the high end of the ordered sample.

BRIEF SUMMARY OF THE INVENTION

One aspect of the invention contemplates a computer-implemented process of developing a person-level cost model for forecasting future costs attributable to claims from members of a book of business, where person-level data regarding actual base period health care claims are available for a substantial portion of the members of the book of business for an actual underwriting period, and the forecast of interest (i.e., future claim amount) is for an actual policy period which can be, but is not necessarily contiguous with the actual underwriting period, having the steps of:

providing development universe data comprising person-level enrollment data, historical base period health care claims data and historical next period claim amount data for a statistically meaningful number of individuals, where the person-level data on a health care claim comprises at least a claim code and a claim amount;

providing at least one claim-based risk factor for each historical base period claim based on the claim code associated with the health care claim and providing at least one enrollment-based risk factor based on the enrollment data; and developing a cost forecasting model by capturing the predictive ability of the main effects and interactions of claim based risk factors and enrollment-based risk factors, with the development universe data through the application of an interaction capturing technique to the development universe data.

A further aspect of the invention contemplates a computer-implemented process wherein the interaction capturing technique is selected from the group consisting of median regression tree techniques, least square regression tree techniques, rule induction techniques, ordinary least squares regression techniques, median regression techniques, robust regression techniques, genetic algorithms, rule induction, clustering techniques and neural network techniques.

Yet another aspect of the invention is a computer implemented process wherein the person-level next period cost forecasts are adjusted by modifying the extant cost forecast by the expected cost trend.

A yet further aspect of the invention is a computer implemented process of wherein the datum from the claims used as predictors consist essentially of the claim- and enrollment-based risk factors and the claim amount is a standardized cost of services provided and the model is used to allocate prospective payments to health care providers.

A still yet further aspect of the invention is a computer implemented process wherein the data used from the claims data consist essentially of the claim code and selected mandatory procedures and the claim amount is a standardized cost of services provided during the same time period as the base period and the model is used to evaluate the efficiency of health care providers.

Another aspect of the invention is a computer implemented process of forecasting future claim amounts attributable to claims from members of a book of business for an actual policy period, wherein the model development universe comprises data from the members of a book of business to be insured, further comprising:

applying the cost-forecasting model to the actual underwriting period person-level data of each of the members of the book of business to generate a person-level actual policy period cost forecast for each member of the book of business; and producing a group-level forecast for the actual underwriting period from the person-level forecasts of each member of the group by totaling the person-level actual policy period cost forecasts for the group for the policy period.

Yet another aspect of the invention is a computer implemented process comprising the step of: setting insurance reserves based on group-level forecast for the actual policy period, wherein the policy period is a reserving period for claims that have not occurred or that have occurred but not been reported.

Yet still another further aspect of the invention is a computer implemented process, wherein claim amounts are a mix of fee for service payments and capitation payments so that the base and underwriting periods risk factors are appended to include dummy variables for the presence of capitation payments by provider type and the cost estimate in the next and policy periods is the fee for service cost that must be supplemented with the expected capitation payments.

Still another aspect of the invention is a computer-implemented process of developing a hybrid person-level health care claim cost forecasting model for forecasting future medical costs attributable to health care claims from members of a book of business, where person-level data are available for a substantial portion of the members of the book of business, comprising the steps of:

providing development universe data comprising person-level data for a statistically meaningful number of individuals, the person-level data comprising continuous variable data and categorical variable data;

processing first the continuous variable data for each individual with a continuous processing technique that captures the predictive ability of main effects and interactions of continuous variables to generate a person-level continuous variable model; and processing the categorical variable data for each individual including the output from the continuous processing technique with a categorical processing technique that captures the predictive ability of main effects and interactions of categorical variables to generate a person-level categorical variable model;

wherein the person-level continuous variable model and person-level categorical variable model together comprise a hybrid person-level health care claim amount forecasting model.

Yet another aspect of the invention is a computer-implemented process of developing a claim amount forecasting model for use in forecasting the future claim amount for members of a book of business, where person-level data are available for a substantial portion of the members of the book of business for an actual base period, and the claim amount of interest for forecasting purposes is an actual next period which can be, but is not necessarily contiguous with the actual base period, comprising the steps of:

processing the base period data having claims to generate a having-claims claim amount forecasting model; and processing the base period data without claims to generate a without-claims claim amount forecasting model, wherein the having-claims cost forecasting model and the without-claims forecasting model comprise a claim amount forecasting model.

Yet another aspect of the invention is a computer-implemented process of developing a health care claim amount forecasting model for use in forecasting the future medical claim amount for members of a book of business, where person-level data are available for a substantial portion of the members of the book of business for an actual base period, and the claim amount of interest for forecasting purposes is an actual next period which can be, but is not necessarily contiguous with the actual base period, comprising the steps of:

providing development universe data comprising person-level data for a statistically meaningful plurality of individuals, wherein the person-level data for an individual comprises health care claims data for the individual and the data on a health care claim comprises at least a claim amount and a claim code;

Winsorizing the person-level data to yield inlier data and outlier data;

processing the inlier data to generate an inlier cost forecasting model; and processing the outlier data to generate an outlier cost forecasting model;

wherein the combination of the results of the inlier and outlier cost forecasting models together produce a person-level claim amount forecast model.

Another aspect of the invention is a computer-implemented process of comprising:

Winsorizing the inlier data to yield inlier data having claims and inlier data without claims;

processing the inlier data having claims to generate an inlier-having-claims claim amount forecasting model; and processing the inlier data without claims to generate an inlier-without-claims claim amount forecasting model, wherein the inlier-having-claims cost forecasting model and the inlier-without-claims forecasting model comprise an inlier claim amount forecasting model.

A still further aspect of the invention is a computer-implemented process of forecasting a claim amount attributable to claims from members of a book of business during an actual policy period, comprising the steps of:

providing person-level data, comprising enrollment data for members of a book of business to be insured for an actual underwriting period that can be, but is not necessarily, contiguous with the actual policy period;

providing a model development universe of person-level data, comprising enrollment data from the historical base period and historical next period heath care claims data for a statistically meaningful number of individuals;

providing enrollment-based risk factors for each historical base period and providing next period claim amounts;

developing a health care cost-forecasting model for the enrollment data by capturing the predictive ability of main effects and interactions of enrollment-based risk factors through the application of an interaction capturing techniques to the model development universe;

applying the health care cost-forecasting model to the person-level underwriting period enrollment data of each of the members of the book of business to generate a person-level expected cost forecast for the policy period for each member of the book of business; and producing a group-level forecast for the expected cost of the policy period from the person-level forecasts of each person of the group by totaling the person-level expected cost forecasts for the actual policy period.

A still further aspect of the invention is a computer-implemented process of forecasting costs attributable to claims from members of a book of business during an actual policy period, comprising the steps of:

providing person-level data, comprising enrollment data and actual underwriting period health care claims data, for members of a book of business, where the person-level data on a health care claim comprises at least a claim amount and a claim code and the actual underwriting period can be, but is not necessarily, contiguous with the actual policy period;

providing a model development universe of person-level data, comprising enrollment data, historical base period health care claims data and historical next period claim amount data for a statistically meaningful number of individuals, where the person-level data on a base period health care claim includes at least a claim amount and a claim code;

providing claim-based risk factors for each historical base period based on the claim code associated with the health care claim and providing at least one enrollment risk factor based on the enrollment data;

developing a cost-forecasting model by capturing the predictive ability of main effects and interactions of risk factors through the application of an interaction capturing technique to the model development universe;

applying the cost-forecasting model to the person-level data of each of the individuals or members of a group to generate a person-level actual policy period expected cost forecast for each member of the group; and producing a group-level forecast for the actual policy period from the person-level forecasts of each individual or member of the group by totaling the person-level cost forecasts for the actual policy period.

Yet a further aspect of the invention is an automated system for forecasting future costs attributable to claims from members of a book of business during an actual policy period comprising:

a central processing unit;

an insured person database, accessible by the processor, wherein the database comprises person-level enrollment data and actual underwriting period health care claims data, for members of a book of business to be insured, where the person-level data on a health care claim comprises at least a claim amount and a claim code;

a model development universe database, accessible by the processor, wherein the second database comprises model development universe of person-level data, comprising enrollment data, historical base period health care claims data and historical next period claim amount data for a statistically meaningful number of individuals, where the person-level data on the base period health care claim includes at least a claim amount and a claim code;

a risk factor encoder, accessible by the processor, wherein the risk factor encoder encodes claim-based risk factors for each historical base period based on the claim code associated with the health care claim and the risk factor encoder encodes at least one enrollment risk factor based on the enrollment data;

a model generator, accessible by the processor, that generates a cost-forecasting model by capturing the predictive capacity of the main effects and the interaction of the risk factors assigned by the risk factor encoder to forecast the historical next period of the model development universe data using the historical base period data;

a person-level cost generator that applies the cost-forecasting model to the person-level actual underwriting period health care claims data of each of the members of the book of business to generate a person-level actual policy period claim amount forecast for each member of the book of business; and an actual policy period group-level cost forecast generator that totals the person-level actual next period forecasts for each member of the group to generate an actual policy period group-level cost forecast.

Still another aspect of the invention is a computer-implemented process of forecasting costs attributable to claims from members of a book of business during an actual policy period, comprising the steps of:

means for providing person-level data, comprising enrollment data and actual underwriting period health care claims data, for members of a book of business, where the person-level data on a health care claim comprises at least a claim amount and a claim code and the actual underwriting period can be, but is not necessarily, contiguous with the actual policy period;

means for providing a model development universe of person-level data, comprising enrollment data, historical base period health care claims data and historical next period claim amount data for a statistically meaningful number of individuals, where the person-level data on a base period health care claim includes at least a claim amount and a claim code;

means for providing claim-based risk factors for each historical base period based on the claim code associated with the health care claim and providing at least one enrollment risk factor based on the enrollment data;

means for developing a cost-forecasting model by capturing the predictive ability of main effects and interactions of risk factors through the application of an interaction capturing technique to the model development universe;

means for applying the cost-forecasting model to the person-level data of each of the individuals or members of a group to generate a person-level actual policy period expected cost forecast for each member of the group; and means for producing a group-level forecast for the actual policy period from the person-level forecasts of each individual or member of the group by totaling the person-level cost forecasts for the actual policy period.

A still further aspect of the invention is a group insurance product comprising:

an identification of the types of benefits which are agreed to be provided by an insurer to or on behalf of members of a group, which will be incurred by members of said group during a future time period; and a stated monetary insurance premium including a forecast of said benefits, estimated costs of administering the insurance product, and optionally, an estimated profit, whereby an insurer agrees to cover the identified benefits in exchange for the payment of the stated monetary insurance premium.

Yet another aspect of the invention is a method of pricing group insurance including a cost of future benefits according to the computer-implemented process of forecasting future medical costs attributable to claims from members of a group during an actual underwriting period, comprising the steps of:

providing an expected amount of administrative costs allocable to providing health insurance coverage to the group;

providing a minimum acceptable expected profit;

totaling the group level cost forecast, expected amount of administrative costs, and minimum acceptable expected profit are to yield a total minimum price, and providing a plurality of expected probabilities of retention for the group corresponding to a plurality of possible prices greater than or equal to the total minimum price, each possible price also having an expected profit that is the amount of the price over the group level cost forecast plus the expected amount of administrative costs; and calculating a plurality of possible maximum profits by multiplying each of the plurality of possible profits by the corresponding expected probability of retention, wherein the largest possible maximum profit, is used to price the group insurance.

Still another aspect of the invention is a method of underwriting an insurance product comprising the steps of:

providing an identification of the coverage of the insurance product which identifies the conditions of payment under the product during a policy period;

providing person-level health care claim information comprising enrollment data, and base period and underwriting period claim data, the claim data comprising claim codes having associated claim costs;

capturing the predictive ability of the person-level health care claim information through the application of an interaction capturing technique; and forecasting a predicted cost of the insurance product during the policy period based on the identification of the coverage of the insurance product and the captured predictive ability of the person-level health care claim information;

wherein each of diagnosis and CPT based risk factor is independent of the sequence in time of other diagnosis and CPT based risk factors.

A further aspect of the invention is a method of underwriting an insurance, for insuring short term disability costs wherein the interaction capturing technique uses a dependent measure from the next period and policy period comprising the number of STD days in the policy period and weights the dependent measure by the expected cost per day for the STD to produce the person-level expected STD costs and summed across the group to produce the group's expected STD cost.

A still further aspect of the invention is insuring long term disability (LTD) claims wherein a dependent measure for generating the cost forecasting model is the probability of a LTD claim in the policy period where the probability is weighted by the net present value of the LTD and applying the cost forecasting model to the person-level data produces person-level expected LTD costs wherein summing the person-level expected LTD costs across the group to produce a group's expected LTD cost for an actual policy period.

A still yet further aspect of the invention is a cost forecast produced for first-dollar health insurance.

Another aspect of the invention is a cost forecast produced for stop loss health insurance.

A still further aspect of the invention is a cost forecast produced for aggregate-only stop loss health insurance.

Still another aspect of the invention is a cost forecast produced for specific stop loss health insurance.

Yet another aspect of the invention comprises is a cost forecast for insuring group term life insurance costs wherein a dependent measure for generating the cost forecasting model is the expected probability of death weighted by the amount of life insurance to produce the person-level expected term life insurance cost.

In a still another aspect of the model development universe comprises data from the members of a group in the book of business to be insured.

A still yet further aspect of the invention comprises the step of: setting insurance reserves based on the renewal group-level forecast for the actual underwriting period, wherein the next period is a reserving period for claims that have not occurred or that have occurred but not been reported.

BRIEF DESCRIPTION OF THE DRAWINGS

FIG. 1 is a flowchart of an embodiment of an overview of a method for estimating future cost and optimizing pricing.

FIG. 2 is a flowchart of an embodiment of a method like that of FIG. 1 which is particularly adapted for service bureau processing.

FIG. 3 is a flowchart of an embodiment of a method like that of FIG. 1 which is particularly adapted for use as a software product, which may be functionally distributed locally or over the Internet.

FIG. 4 is a more detailed flowchart of a process for data processing of steps 102, 202 or 302 of FIGS. 1, 2 and 3.

FIG. 5 is a more detailed flowchart illustrating a process for standardizing time periods, for use in the methods of FIGS. 1-3, and in particular steps 102, 202 and 302.

FIG. 6 is a flowchart illustrating data validation and standardization procedures for steps 102, 202 and 302 of the methods of FIGS. 1-3.

FIG. 7 is a flowchart illustrating the matching and merging (integration) of data in the process steps 102, 202 or 302 of FIGS. 1-3.

FIG. 8 is a flowchart illustrating the aggregation and risk factor coding for the steps 102, 202 or 302 of the processes of FIGS. 1-3.

FIG. 9 is a flowchart of processing steps for developing cost forecasting models based on "inlier" data in steps 106, 204, 210, 304 or 310 of the methods of FIGS. 1-3.

FIG. 10 is a detailed flowchart of process steps for developing cost forecasting models based on "outlier" data of the Winsorized data for the steps 106, 204, 210, 304 or 310, of the methods of FIGS. 1-3.

FIG. 11 is a detailed flowchart for scoring, testing and integrating the data, and adjusting for cost trends for use in steps 106, 204, 210, 304 or 310 as well as 108, 208 and 306 of the methods of FIGS. 1-3.

FIG. 12 is a detailed flowchart illustrating processing steps for developing group-level models and making adjustments to the summary of the person-level data of steps 106 and 108 of FIG. 1, 204, 208 and 210 of FIG. 2, or 304, 306 and 310 of FIG. 3.

FIG. 13 is a detailed flowchart of an embodiment of a price optimization procedure which may be used to carry out steps 110, 212, or 308 of FIGS. 1-3.

DETAILED DESCRIPTION OF THE INVENTION

The present invention is directed to insurance systems, particularly including methods for processing health insurance data to estimate future costs, and for optimizing pricing of health insurance products, including both first-dollar and stop loss insurance products. In various aspects, it involves processing historical data, developing algorithms, applying those algorithms, updating those algorithms and setting prices. However, the insurance systems that can benefit from the methods and systems disclosed herein also include, but are not limited to, health insurance, disability insurance, both short term and long term, as well as term life insurance systems.

This invention comprises a series of related products that provide more accurate group-level claim amount forecasts (and person-level forecasts for individual or family health insurance) and more optimal group-level renewal prices for insurers at full risk for the health insurance (e.g., indemnity, PPO, HMO, POS) or aggregate only stop loss health insurance for self insured employers. These forecasting models for renewal price setting are not intended to be used for paying managed care providers but alternate related models are developed for that purpose (see B in Table 1 below). The products provide more accurate future cost estimates by forecasting person-level costs using models that include clinical information from historical health insurance claims as well as person-level demographic and historical cost data. In this regard, effective models may be based on data from relatively large groups of at least 50,000 people, such as typically covering an entire book of business for an insurer (or a large subclass of the insurer's book of business such as all HMO groups of the insurer) or in the case of a TPA, the TPA's entire book of business. The most recent year of person-level medical claim data for the individuals of a particular book of business for which an accurate cost forecast is desired may be processed by this model, to produce an accurate projected cost for policy pricing, as will be described. Future cost trend estimates (inflation) are adjusted for each individual's characteristics and applied to the person-level estimates. Person-level cost forecasts are summarized to the family-level or group-level and family or group-level characteristics are used to adjust the summarized cost to produce the adjusted family or group-level cost forecast. The price is optimized using a system that estimates the probability of the group accepting the insurance at the price offered, given the group's historical insurance cost, historical claim's history, and local competitive market conditions. The probability is weighted by a function of the expected future profit, which equals the anticipated price less expected medical and administrative costs. The method and models with slight adjustments can be applied to self insured employers aggregate only, specific only or specific plus aggregate medical stop loss data. The products also include the use of the method applied to a client's book of business for estimating future claim amounts for purposes of setting a reserve by group and for cost forecasting and pricing for new groups or individuals for fully insured health insurance. Another alternative application would be the use of the method to develop and deliver products that allow HMO's to prospectively allocate health care payments to providers. Another product is the measurement of the efficiency of health care providers. These methods can be applied to medical claims linked to future short or long-term disability payments or indicators of disability and used to rate the relative risk of disability of groups or forecast their future costs by using the groups medical claims, enrollment data and summarized group-level or person-level disability payments. Another application is to group term life insurance. The dependent measure is the probability of death next period which is linked to medical claims in the base period and the potential risk factors are the same potential risk factors as used with the other models.

The modeling strategy employed for the cost forecasting models contains several novel components. We have used a combination of specialized data collection and cleaning, regression trees and regression (ordinary least squares or OLS, logistic and median) models tailored to a client's book of business, and the application of these models to the client's book of business for improved decision making. While there are many published examples of OLS being used for purposes similar to this application, there are a few using trees. We are not aware of any reports using a combination of regression trees and other regression models to forecast health care costs. The use of the output of a tree model as an input to other regression algorithms is known as "hybrid" tree models. (See D. Steinberg and N. Scott Cardell, Improving Data Mining with New Hybrid Methods, Salford Systems, 5127/98, Powerpoint @ http://www.Salford-systems.com). They give examples of models with a binary (yes-no) dependent variable for which they used the regression tree output as predictors in a regression model. They demonstrated that this hybrid combination was superior to either method used alone. When our dependent variable is cost we used OLS regression with the output of regression trees and when the dependent variable is a probability, we used logistic regression. This allowed us to have continuous valued predictions rather than the step-like predictions characteristic of trees and contingency table forecasts. Our use of the terminal nodes of a regression tree as predictions in an OLS or logistic regression model provides an effective way to have both the main effects and complex interactions of candidate predictors properly weighted in our final model.

A typical group health insurance product in accordance with the present invention (such the various types of Blue Cross™ and Blue Shield™ brand group health insurance policies, which are incorporated herein by reference) comprises an identification of the types of medical expenses which are agreed to be covered, paid or reimbursed by an insurer to or on behalf of members of the group (including their covered dependents) which are incurred by members of the group during a future time period, typically one year, in exchange for a stated monetary insurance premium which includes a forecast of said medical expenses in accordance with the methods described herein, estimated costs of administering the health insurance product, and an estimated profit.

Table 1 summarizes the alternate uses of our method as applied to health care enrollment and claims data linked with claim amounts for first dollar and stop loss coverage, disability coverage, reserves and term life coverage. These alternate model development produce products that are customized for specialized applications. Row A-1 is the application of our invention which is presented in most detail in this application. The methods used in A-1 are clearly related to those in each of the other rows.

not provided. Generally, CapCost™ is a better value for the employer than traditional stop loss coverage when the employer is larger than the average employer purchasing stop loss coverage or if the group has experienced some unusually high annual medical expenses due to a few high cost individuals that are unlikely to have high costs recurring in the near future.

TABLE 1

Applications of the Invention's Modeling Methods

| Application | Allowable Sources of Candidate Risk Predictors | | Dependent Variable for Services Provided During Dep. | Reference Times for Dependent & Predictor | |
|---|---|---|---|---|---|
| | Enrollment Data | Claims Data | Variable Ref. Time | Variables | Model Type |
| A. Predict Future Costs of Health Insurance | | | | | |
| 1. Renewal Groups or Individuals | All | All | Cost of Claims | Predictor Variable Precedes | Prospective |
| 2. Stop Loss: Specific Only, Aggregate Only or Specific Plus Aggregate | All | All | Cost of Claims over Deductible, over Attachment Point or Both | Predictor Variable Precedes | Prospective |
| 3. Required Reserves | All | All | Reserve Period IBNR | Predictor Variable Precedes | Prospective |
| 4. New Groups or Individuals | All | None | Cost of Claims | Predictor Variable Precedes | Prospective |
| B. Allocate payments to health care providers | All | Diagnosis | Standardized Costs of services provided | Predictor Variable | Prospective |
| C. Measure "Efficiency" of care providers | All | Diagnosis & selected mandatory procedures | Standardized Costs of services provided* | Predictor Variable concurrent with Dependent Variable | Retrospective |
| D. Short Term Disability Payments | All | All + STD Claims | STD days, Cost or Index | Predictor Precedes | Prospective |
| E. Long Term Disability | All | All + STD + LTD | Probability LTD, Cost or Index | Predictor Precedes | Prospective |
| F. Group Term Life | All | All + Death | Probability Death, Cost | Predictor Precedes | Prospective |

*Costs per service can be standardized by use of relative values for CPT codes and DRG weights for hospital care or average actual costs for each service Optimal pricing for a fully insured group requires an accurate forecast of the group's mean cost per person in the policy period. Optimal pricing for an aggregate only medical stop loss insurance for a self-insured employer also requires an accurate forecast of that group's mean cost per person in the policy period. Therefore, the exact same methodology can be used for the cost forecast for fully insured groups or for self-insured group's aggregate only stop loss insurance if the same data are available. There is a difference in the methods used to set prices since the employer will pay for the majority of the medical expenses when it is self-insured and thereby paying a premium that is far smaller than with full health insurance when the insurer pays all of the medical costs.

CapCost™ is an aggregate only medical stop loss product that includes a system for making more accurate cost forecasts (for groups with 51 to 3000 employees mainly). The attachment point for CapCost™ can be the standard 125% of expected costs (called CapCost 125™) but we will offer an attachment point at 110% of expected costs (called CapCost 110™) and possibly other attachment points. The terms of CapCost™ are similar to those of traditional medical stop loss insurance, but there is cash flow protection, medical costs are cumulated on an incurred basis rather than a paid basis, and there is no specific stop loss coverage. CapCost™ is useful for employers since many will receive prices that are below the price of traditional specific plus aggregate medical stop loss insurance while the maximum aggregate medical liability for the group may be lower with CapCost™ than with traditional specific plus aggregate medical stop loss insurance. From the insurers perspective, the expected medical claims it must pay with CapCost™ are frequently below those of traditional medical stop loss products since specific stop loss coverage is CapCost™ is novel in the way expected future medical costs are estimated. Historical medical claims, enrollment, benefit plan and employer files in electronic format are collected from the Third Party Administrators (TPA) or insurance company that is paying the employers medical bills. The electronic files containing the medical claims and enrollment data are collected for all people with medical coverage rather than from only those that had large claims. This invention's cost forecasting models are applied to the insured people covered by the employer. The inflation trend and optimized pricing are then applied to the cost estimates. The CapCost™ product is a system for data collection, cost estimates, and price optimization and is part of this invention. Separate products are designed for pricing new or renewal coverage for fully insured medical plans and for allocating reserves for such medical plans. Each contain a system for data collection and cost estimation. Price optimization is an additional part of this invention for fully insured medical plan renewals and stop loss coverage.

One of the important measures of the quality of a model is the mean absolute residual (MAR). The MAR is the mean of the absolute value of the difference between the actual and predicted cost of a group. A lower MAR is desirable since the predicted cost is closer to the actual cost. We compared the MAR for this invention's predicted cost with the MAR calculated using an experience model and the MAR calculated using a demographic look-up table model. The results are presented as a percentage of the mean of the groups costs or the predicted divided by the actual times 100. The MAR was 11.6% for the invention's prediction, 14.2% for the experience model, and 25.8% for the demographic model for the 116 actual groups in our database. The invention forecast was substantially better than either of the two conventional forecast methods.

We conducted a Monte Carlo simulation for groups with various numbers of employees since our database is too small to analyze by group size. We randomly selected 1500 enrollees and their dependents and made 500 synthetic groups. The MAR as a percentage of the groups actual cost was about 7% for the inventions forecast and just under 10% for the experience forecast. A demographic forecast was not compared since groups with over 1500 employees and their dependents are deemed completely credible.

A measure of model accuracy addresses whether and by how much the model systematically over or under predict the actual costs for various characteristics of the insured population. In order to compare this accuracy measure of two models, we sort the (actual) cost of groups into deciles from the lowest 10% to the highest 10%. We calculate the predicted (forecast) cost for the groups in each (or finer gradation) decile. The actual cost is divided by the forecast cost to make an index. The index should be close to 1.0 if the model is accurate. In our simulation tests (500 groups of 1500 employees), the invention's forecast is always closer to 1.0 for every decile indicating that it is a superior model to the experience model. The invention's ratio of predicted to actual was about 0.91 for the lowest decile and about 1.32 for the highest decile while the experience models ratios were about 0.85 and about 1.55, respectively. The other deciles were closer to 1.0 but the invention forecast was always closer to 1.0 than the experience forecast.

The invention includes a general process for developing models for forecasting health care costs. The invention also includes processes for products that incorporate the process and provide information for improving specific business decisions made by health insurers, including, but not limited to, aggregate only, specific only and specific plus aggregate stop loss health insurance products. The models may be developed for specific insurers and their book of business, and may be different for each insurer. A software listing of an embodiment of a program for carrying out a forecasting process in accordance with the present invention is present on the above-cited CD-ROMs. Illustrated in FIG. 1 is a flowchart which represents an overview of an embodiment of a method in accordance with the present invention as applied to cost forecasting and pricing of renewals for health insurance for fully insured groups as shown in FIG. 1.

In accordance with the method of FIG. 1, health data on members of the book of business is collected, cleaned, integrated and aggregated, as shown in step 102. If the data are missing or miscoded, the cost forecasts may be inaccurate also. Most of the programming cost and analysis involves these phases of the process. The client's data may typically be in many different computer systems or databases, and the data may need to be combined to build person-level files that are complete for a specified time period.

A twelve month "base period" is typically used as the period from which we collect this data to describe each person's history of claims, diagnoses and other factors. The base period could be a longer period or shorter period and will depend on how long the groups have been enrolled and the time for which adequate computer or other records are kept. The base period may have different time periods for people and groups that do not have the same enrollment renewal dates.

There is typically a period between the "base period" (or underwriting period) and the "next period" (or policy period) during which medical claims data are not available, since they were incurred but not reported or they are between the time of the price quote for policy period's renewal and the renewal date. We call this the "lag period". The examples here use a lag period of three months but that could be a longer or shorter time period depending on the needs and constraints of the available data, the insurer or others.

The "next period" is typically the period of twelve months of insurance coverage immediately following the lag period. The claim amount forecast period is the next or policy period that is priced for the group. The "next period" is the relevant time period for the dependent variable in the cost forecast models.

If the insurer for which future health costs are to be forecast (e.g., a business entity which desires to provide health insurance) is a new client, (e.g., has not had models previously built on their book of business) then a new cost forecasting model may need to be developed for them, for example, as shown in step 104 of FIG. 1. An alternative is to use existing forecasting models and recalibrate those models to the new or updated data. Our methods include a systematic process to develop new models or recalibrate old models. A new model is developed when the old database upon which the old model was developed is not representative of the new database. This might occur if the new database is substantially different in size, covers a different geographic region, contains different types of insurees (e.g., predominantly elderly in Medicare; pregnancy and children are characteristic of Medicaid) or different types of payments (e.g., capitation payments plus fee for service payments).

The selection of the population to be modeled is of key importance since the predictor variables and their weights will reflect not only the specific needs of the population, but also the practice patterns of those providing care and the prices charged for its health care services. The ideal population to use as a standard is the CI's book of business for which the forecasts are needed, provided it is of sufficient size. We have found that an insured population (i.e., book of business) as small as 50,000 persons can produce robust cost forecasts.

Use of another, smaller or less representative population as a standard can cause problems in both the selection of risk factors because there is no reason to believe that needs per person even after adjustment for demographic factors, nor practice patterns of providers, nor prices per service will be similar enough in the index population as what amounts to a convenience sample, no matter how large the latter may be. The three cost component factors are known to vary from geographic locale by socioeconomic status of the insured and the characteristics of the providers and the features of their health insurance.

As shown in step 106, if it is determined that a new cost forecasting model should be developed, there is a specified process for developing the model. The method for developing the new cost forecasting model is part of our product and it can be applied to any medical insurance database that includes the necessary information.

To develop a new cost forecasting model for a specific customer, we need data from groups that were in its historical "base period" and "next period". Claims data from the "lag period" are not necessary since it need not be used in the model but it is generally collected. The cost forecasting model is calibrated on the historical data to model the dynamics of medical care, practice patterns, and pricing in the geographic markets and provider networks used by the customer. The groups of insured people used as a standard in our models must be enrolled for at least the last day of the "base period", for the entire lag period and the next period. Multiple sets of base period, lag period and next period can be used to increase the amount of data used to create the cost forecasting model. More data produces more robust models, but must be adjusted for secular cost trends when there are multiple calendar years for the "base period".

Scoring the data for pricing insurance for the policy period involves applying the forecasting model to the data for the underwriting period that will be used to forecast cost for the policy period—the renewal year that needs pricing, as shown in processing block 108. Generally, the most recent nine months of the previous next period will be in the new underwriting period offset by the three month lag period. This helps in processing the data needed for predicting future costs. The first step in the scoring 108 is applying the data steps to the new underwriting period that have not been previously applied (e.g., coding of risk factors). Second, the cost forecasting model is applied to the person-level data. External health care inflation forecasts from the CI or consulting organization are then used to adjust the prior year's trend inherent in the person-level forecasts. The person-level inflation adjusted cost forecasts are then aggregated to the group-level. Third, group-level adjustments to the forecasts are applied for benefit plan design, SIC code, and other factors influencing group costs.

Having forecast the group's future medical expenses, over the selected (e.g., 1 year) period, the price to be charged for the medical insurance for the group for that period may be determined, as shown in block 110 of FIG. 1. The insurer generally desires to obtain a fair, or even maximum profit, without causing the group to leave for another insurer. The competitiveness of the market, historical prices, and historical costs are all factors that will influence the likelihood of the group being retained at any given price. The policy premium, the price to be charged to the customer for the medical insurance coverage for the specific group, comprises the forecast medical cost, the insurer's overhead and other business expenses, and a projected profit. The client's underwriter(s) are asked to provide explicit probabilities of retaining a group at various price increases. These probabilities are multiplied by the expected profit if the group is retained, resulting in the expected profit for that group at each price increase. The information is presented to the underwriter with the premium price that optimizes profit highlighted and recommended. These recommended prices may be more or less than prior prices, but will typically more accurately reflect the future medical costs of the specific group.

FIGS. 2 and 3 similarly provide an overview of the information flows for two different embodiments. The embodiment of FIG. 2 involves substantially only the transfer of data. The embodiment of FIG. 3 involves installing software at the client or an Internet connection with the client's software.

Shown in FIG. 2 is a "service bureau" embodiment in which all of the data preparation, cost forecasting, model development, scoring the data, and pricing for specific individual groups is carried out at a service bureau location. As shown in block 202, medical history and claims data for members of the group are sent to the service bureau location, and a cost forecast or per group price or both are sent back to the client (see 212). An alternative is for software to be installed in the client's (insurance company's or third party administrator's) operations with model updates being periodically provided to the client.

This historical data (typically provided by an insurance company or TPA) is used to develop a model that is calibrated to the book of business (see the sample data requested of the client, and/or for specific policy types of insurance companies). A base period, lag period, and next period are required as a minimum. The data are fully validated prior to the model development.

As shown in block 204, cost forecasting models are developed which include person-level inlier models based on the Winsorized data (see FIG. 9) and outlier cost components (see FIG. 10), inflation adjustments (see FIG. 11), group-level attribute models (see FIG. 12), and pricing models (see FIG. 13).

As shown in block 206, once those models are developed and preferably fully tested, we are ready to work with the most recent data available to score the data as shown in block 208 and establish cost forecasts and set prices for upcoming medical insurance coverage. The most recent data are sent to us for validation, scoring, future cost estimation, cost trend adjustments and pricing (blocks 206 and 208). The data submission is done approximately on a monthly or quarterly basis. There is a trade-off between getting the most recent claims data available for pricing and the effort required to validate the data submitted at a higher frequency and shorter intervals.

The data are stored and combined with the previous data submission until three to six months of new data are available, as shown in block 210. The new data are combined with the most recent data from the previous data submission so that the most recent 12 months of data are available and are used as the updated next period for recalibration of the models to be used for scoring other groups. In other words, the old models are refit with the new data and updated cost trends are included also. Every one to two years the models may be revised with updated predictor variables and weights. Redoing the models will help capture changes in practice patterns and relative pricing.

As shown in block 212, the summarized cost forecast and pricing information are sent to the client for use by underwriters or in an automated quotation system. The insurance company or other underwriter client may also use its own pricing algorithm using the cost forecast produced by the method of FIG. 2.

As indicated, FIG. 3 similarly illustrates an overview of an embodiment of the present invention which may be directly utilized by a health insurer or medical underwriter.

As shown in blocks 305, 306, and 308, the various parts of operational software and work flows of the client database may be adapted to automatically extract data, validate it, score the data with the forecasting models, and price the groups. The medical history, cost and other data elements used, and timing of the data extracts are normalized or standardized for utilization in the method and automating the recalibration of the models as shown in block 310. An alternative to installing the software on the client's computers is to perform that task using the Internet (as an Internet Service Provider or ISP) to extract the data and return cost forecast and group prices to the client.

As shown in block 306, processing software modules for carrying out the present method may be installed on client computers, to utilize the standardized data for the software.

As shown in block 308, after determining the medical cost forecast for a specific group, the prices are offered to that group for renewed medical insurance, whether it be first-dollar, stop-loss or other coverage. This can be done using a human underwriter or as part of an automated quotation system.

The software will capture the updated data and combine it, as shown in block 310. Those data will be used to recalibrate the models after about three to six months of data accumulation. The updating may be performed offline, or may include automatic database updating and model recalibration. Completely new models may be developed about every one to two years offline.

Having described an overview of several embodiments as illustrated in FIGS. 1-3, various processing steps of the illustrated methods will now be described in more detail.

402 The first step in the data portion of the process is the data request. We do not need to have data in a predetermined layout or format. Some variables may not be available for a given CI, TPA or other data provider. This process is flexible so that it can be modified to work around alternative formats and data sets used to formulate the candidate predictor variables. However, the dollar value of claims made in the base period and claims paid (or disability or life indicator ratios) in the next period are essential. Enough time for run out of claims is necessary so that incurred but not reported (IBNR) claims are included in the data. The following is an example of a data formats, which may be used as a request for health and medical cost data to be used in the forecasting of medical costs:

Example Data Request

In a preferred embodiment, this data may preferably be in the form of five different data files that are linked by an encrypted identifier. The identifier should include unique characters for the company, family, and person. The data files should include group-level information, person-level information, detailed medical claims information (e.g., hospital, physician, durable medical equipment, home health, etc.), detailed pharmacy claims and capitation information, if germane.

Preferably, data for a relatively large number, e.g., 500,000 people, covering 27 consecutive months (12 month base, 3 month lag, and 12 month test periods).

Descriptions of preferred data are as follows. Some of these variables may not be readily available, especially some of the group-level variables, and accordingly would not be used in the model building and medical cost forecasting. Other data which may define useful variables may also be included.

1. Group-level data (for any group covered during the test period)
   a. Company identifier
   b. Group location (zip code or state and county codes)
   c. Benefit plan description (format and content TBD)
   d. SIC code or other industry classification
   e. Original group effective date
   f. Employer and Employee premium contribution %
   g. Total number of covered employees on date last renewed or date lapsed
   h. Next scheduled renewal date
   i. % employee participation
   j. Capitation payments by provider type by geographic locale 2. Enrollment data (person-level for each person covered above)
   a. Company identifier
   b. Person identifier
   c. Age and birth date
   d. Sex
   e. Relationship to employee
   f. Status of employee (e.g., COBRA, pensioner)
   g. Employee type (e.g., hourly)
   h. Zip code of residence
   i. Date of enrollment
   j. Date of termination during study period, if any
   k. Presence of other health insurance (e.g., spouse coverage, Medicare)
   l. Salary or wage
   m. Amount of term life coverage
   n. Amount and terms of disability coverage 3. Medical claims (claim-level)
   a. Person/company identifier
   b. Service line-level information:
      i. Billed charges, covered charges, payments, amounts applied to deductibles, coinsurance, co-pays, and out-of-network penalties, amounts of COB, pre-existing, capitation payments and other cutbacks
      ii. Dates—incurred, entered, and paid
      iii. Array of ICD-9 diagnoses (5+) for each claim
      iv. CPT code for each claim
      V. Provider type (e.g., physical therapist, clinical psychologist, cardiologist)
      vi. For confinement in any sort of inpatient facility, include partial bills, DRG for inpatient hospital, admission and discharge dates, partial/final bill indicator
      vii. Service type/location (e.g., ER, surgicenter, home)
      viii. Amount of subrogation
      ix. Type of payment (e.g., fee for service or capitation)

4. Pharmacy data (claim-level)
   a. Person/company identifier
   b. National Drug Code or other classification
   c. Date of prescription
   d. Number of units, dose of units, and number of units/day (if available)
   e. Billed charges, discounted charges, and payments 5. Capitation payments, if germane
   a. Geographic locale or market
   b. Provider type
   c. Amount and dates
   d. Method for payment (e.g., per member per month)

The models can be built without pharmacy data if that is not covered by the insurance. Enrollment and medical claims data are required. Many of the group-level variables are desirable, but optional. The data format would specify the dates for the beginning of the base period and the end of the next period or new base period to be used for the cost forecast for pricing. Because the data may originate from a variety of different databases and sources, control totals (e.g., number of records, sums of fields) are also included, to assure that the data is excerpted and formatted properly. The customer or TPA may provide a layout or format for the data, because a specific format is not required. The layout or other documentation should, however, describe all of the legitimate values for the variables and the meaning of those values (e.g., provider type=3=physician).

As shown in block 404 of FIG. 4, the customer or TPA sends a layout and a sample database, so that tests can be run prior to extracting all of the data. Valid ranges of variables are checked as shown in block 406. Control totals are matched, and encrypted IDs may be tested. The data need not be aggregated and tested since it is a small subset of the data universe, but the conformity of the sample data to the layout is checked.

If the database is accurate, the entire universe of data is processed, as shown in block 408.

If the database and layout do not correspond or there are data values outside of the range of legitimate values, the data extraction program or layout are fixed and another sample data set or layout is tested.

The dates for the model development overall, and the base period for actual cost forecasting and pricing are established and defined, and the respective dates for each respective group have been set prior to the data request. Now the dates for each group must be determined for its inclusion in the universe of the model development.

As shown in FIG. 5, the process perhaps is easiest to understand by working it backwards. A list is developed for the renewal dates for the first year of coverage that would have prospective prices set using this method, as shown in block 502. The following Table 2 lists an example of time sequencing for developing models and implementing cost predictor models.

TABLE 2

Time Sequences for preparing and Implementing Cost Prediction Models

| Number of Consecutive Calendar Months | A Model Development | B[a] Model Implementation for Predicting Costs and Setting Prospective Prices |
|---|---|---|
| 12 | Base Period Data | |
| 3[b] | Lag in Data | |
| 12 | Next period | Underwriting Period Data |
| 3[b] | Model Weight (re) calibration | Forecast Cost, Incorporate Inflation Forecast and Set Premium |
| 12 | | Policy Period |

[a]Column B pertains to Groups which have the same renewal data (e.g., January 1)
[b]Periods greater than 3 months, may be required for these phases depending on clients needs The groups need to get a price in advance of the coverage date for new customers, or the renewal date for existing customers, to accept or reject it prior to the renewal coverage. Additionally, time for receiving data from the client or a TPA and analyzing it must be added to the lag period. We have used a three month lag period, may be used in processing block 504, but it could be longer or shorter depending on database and business needs.

As shown in block 506, the beginning of the lag period is the last date that bills can be paid for the base period of the model development period. Otherwise, the cost forecasting model would include information that would not be available in the future. The lag period information (claims paid or made) need not be used to provide an accurate cost forecast for a future time period for a particular group. The claims incurred during the next period is the dependent variable for the model of the illustrated embodiment. An estimate of claims incurred but not reported may be added on if there is insufficient time for a proper run-out period (i.e., if only one base period and next period are used for model development). The lag period precedes the next period and the base period is typically the year preceding the beginning of the lag period in the universe of model development.

Table 2 illustrates one example of timing for the processing of block 508. Column A represents the model development period and Column B represents timing for the application of cost forecasting and prospective pricing. The model development time period precedes the actual pricing period but there is overlap since the next period of the model development period is used as part of the underwriting period for the application of cost forecasting and the pricing model. The timeline will be modified when longer lag periods are required. Column B pertains to groups with the same renewal date. Alternate flowcharts may be used to represent each renewal date.

Illustrated in FIG. 6 is a flowchart illustrating data validation and standardization procedures for steps 102, 202 and 302 of the methods of FIGS. 1-3.

Preliminary data validation checks, and initial data preparation as a second set of data checks, as shown in block 602. Utilizing a file structure that will allow for standards to be compared to the data prior to the data aggregation is a facilitating procedure.

As shown for processing by block 604, medical claims include diagnoses that are typically coded in ICD-9-CM codes, procedures that are coded in CPT codes, prescriptions that are coded using NDC codes, hospitalizations coded using DRGs, ICD-9-CM and other codes, that may appear on claims. Tables are developed that contain the values for all of these codes. These tables are standards for comparison with the customer's data and the values in the data must correspond to valid values for these coding systems.

As shown in block 606, tables are made for each client, because the place of service, type of provider, dates, and other fields on the claims and enrollment data will frequently have values that are idiosyncratic to a particular database or customer.

The values should preferably be put in a table format that will allow checking and standardizing the data for accuracy, as shown in block 606.

As shown in 608, the time periods at the group-level (see TABLE 2) may be used to screen if claims and insureds should be in the universe. A table is used for comparison. Prior experience permits the development of norms that can be used to check the data for reasonableness. Examples include the charge and payment per claim, the number of claims per person, and other norms. These values are put into a table for comparison, and processing in block 610.

Preparation (see block 612) of the raw data involves the same data process steps used in FIG. 4, utilizing specified read programs.

The data (see block 614) are provided in the agreed upon medium, the data are read and control totals are checked, see block 616. If errors are noted, the cause is determined and corrected.

The raw data are reformatted, see 618, into a SAS database in the illustrated embodiment. Other database software (e.g., SPSS, Oracle, etc.) could be used which are also capable of handling large scale databases.

In subsequent process steps as shown in FIG. 6, the fields are reformatted (see 620) so that the values correspond to the standard tables, the group-level time period (see TABLE 2) tables are used to extract, see 622, the universe of relevant claims and insured people, and claims for people that are not in the model development universe are put into a separate file (see 624). Data following the model development universe time period may fit into the underwriting period data that will be used for the application of cost forecasting and pricing.

The claims and enrollment data from the model development universe are compared, (see 626) to the standards. A decision is made, see 628, whether the data are in compliance with the standards.

Data that do not match the standards are put, see 630, into a separate file. The cause of the mismatches is evaluated, and the data is deleted or corrected where appropriate. Records may need to be sent back to the customer for replacement or fixing. If there is a large number of mismatches, they must be fixed prior to aggregation.

The records that match the standards need to be matched and merged, see 632, into person-level summaries. Incomplete data should not be aggregated as it will be misleading.

FIG. 7 is a flowchart illustrating the matching and merging (integration) of data in the process steps 102, 202 or 302 of FIGS. 1-3.

In order to match and merge the enrollment and claims data, there needs to be a unique group, family within group, and enrollee or dependent within family identifier, as indicated in the processing of block 702. The social security number or other identifier is encrypted so that actual people cannot be identified and group numbers are used instead of company names. Street addresses are not used so the people cannot be personally identified. However, records need to be linked for accurate models and pricing. One linking system that is effective uses the group ID as a prefix, encrypted social security number of the enrollee as the family ID, and enrollee or dependent number as the person ID. Birth dates and sex are useful as checks on the ID.

As shown in processing blocks 704, 706, the claims data are prepared separately, and a look-up table is generated that lists the group, family, person ID for all claims with the respective birth date and sex.

In accordance with processing blocks 708, 710, the enrollment data are used to develop a separate enrollment look-up table which contains the same information as the claims look-up table. There will be more in the enrollment table since each person in the group does not necessarily have a claim but should be in the enrollment file.

The processing for the respective blocks of FIG. 7 are described as follows:

712 The tables are merged and compared. The claims table should be a subset of the enrollment table. Claim IDs that do not match enrollment IDs indicate an error. These claims are put into a separate file and manually analyzed.

714 The claims records that match enrollment records are merged together into one long variable length record.

716 The person-level merged file contains the enrollment information and claim information, but the record is not aggregated.

718 A flag is assigned to people that have claims and enrollment information since these records will require aggregation.

720 A flag is assigned to people that do not have any claims since their record does not require aggregation.

722 Additional data validation checks occur such as the number of insureds per group and the percentage of people within each group that have no claims.

724 If there are aberrations in the data, there is a manual review. If that does not fix the problem, the errors are reviewed with the customer.

726 The data are valid and ready to transform into the analytic database.

FIG. 8 is a flowchart illustrating the aggregation and risk factor coding for the steps 102, 202 or 302 of the processes of FIGS. 1-3. The respective processing blocks of FIG. 8 are described as follows:

802 The claims data are sorted by person ID by incurred date of the claim.

803 This sort allows for a final screening on the chronological eligibility. A person in the group typically needs to have at least one day of eligibility in the base period and next period and continuous eligibility between those dates. Otherwise, they are dropped from the modeling database. If a person loses eligibility prior to next period, he or she is dropped from the entire analytic database. If the person enrolls in the lag period, that person is kept in a separate analytic database. This last category of people will have their next period payments compared to those of similar demographics. If a person is enrolled in the base period and disenrolls during the next period, those people are put into a separate file in the analytic database. Their next period payments will be compared to people with the same characteristics that did not leave in the next period. People in other time sequences may be dropped from the analytic database.

804 A new record is produced for each person. It includes the enrollment data and information extracted from the claims, when available. The risk factors use ICD-9-CM codes, CPT codes, place of service, provider type, demographic data, and other variable (see risk factor listing in Appendix G). As the records for a person are read, the ICD-9-CM diagnosis codes, CPT codes and other variables that are used to define the risk factors are extracted from the claim records. The new record is a vector of variables that are initialized to zero and then incremented by one when that variable is read in the claims. These variables are coded from claims from the base period only. Payments and charges are summed for the base period, lag period, and next period. It is important to compare the expected cost from the forecasting model with the actual cost next period of those that were not in the modeling universe. If there are large discrepancies, the model may need adjustment.

806 The risk factors are then coded by processing the information on each person's aggregated record (See Appendix G). Risk factors were developed using a combination of expert medical opinion, statistical analyses, and knowledge of the medical insurance market. Diagnoses are divided into diseases and conditions and by inherent risk. Procedures are divided by body system, type of test, type of procedure, and type and site of care. Other risk factors are designed based on the relationship to the enrollee, family composition and demographics. There is a trade off between a very specific risk factor that has very few but very homogeneous people in it and broad risk factors that have heterogeneous people in it. Correlations with the next periods payments and regression models are two ways to determine if a risk factor is worthwhile empirically. The base period charges and payments plus the shape of relative amounts of those payments by month, day, or other amount of time are some of the strongest risk factors (See TABLE 4). The amount of time enrolled in the base period is another risk factor. The key is developing robust risk factors that are not too heterogeneous. A priori logic plus trial and error are useful approaches. Our candidate risk factor codes are listed in Appendix G. TABLE 5 illustrates two family composition risk factors. A detailed listing of risk factors is contained in Appendix G: Risk Factors.

TABLE 4

Risk Factors for person level experience

| | |
|---|---|
| Hibymos1 | The maximum cost per day for any month cost for the base period |
| Hibymos2 | The $2^{nd}$ Highest cost per day for any month for the base period |
| Hibych2a | (1,0) 1 = The second highest month cost per day is adjacent to the highest month |
| Hibych2b | (1,0) 1 = The second highest month cost per day is not adjacent to the highest month |
| Hi1dvby | The index of Highest cost per day divided by average cost per day per month |
| Hi2dvby | The index of $2^{nd}$ highest cost per day divide by average cost per day per month |
| Tenmoch | Average from the sum of all months in the base period excluding the 2 highest months per day |

TABLE 5

Risk Factors - Family Composition

| | |
|---|---|
| Ensxkd | Combines the use of Employee Relationship: |
| | '1' = 'A Enrollee' |
| | '2' = 'B Spouse' |
| | '3' = 'C Son' |
| | '4' = D Daughter' |
| | '5' = 'E Stepson' |
| | '6' = 'F Stepdaughter' |
| | '7' = 'G Other Male' |
| | '8' = 'H Other Female' |
| | '9' = 'I Surv Spouse' |
| | and Gender of Enrollee: |
| | 'M' = "male" |
| | 'F' = "female" |
| | values for ensxkd: |
| | 1 Enrollee, Male |
| | 2 Enrollee, Female |
| | 3 Spouse, Male |
| | 4 Spouse, Female |
| | 5 Son, daughter, Stepson or Stepdaughter |
| | 6 Other Female or Surviving Spouse |
| kid1_3 | Count of the Number of Children in a family. 0 = no children, 1, 2 or 3 or more children |

Some insurance plans are paid on the basis of a combination of fee for service (FFS) payments and capitation payments. The previous discussion has assumed a FFS payment system. If the combination or hybrid payment system is used, then adjustments for capitation payments must be made at the person and group levels. We recommend developing risk factors as dummy variables when there are capitation payments for a particular provider types (e.g., primary care, obgyn). This is especially important when the capitation coverage is not consistent across groups or geographic region.

808 Validation checks can now be made on person-level data. Frequency counts for dichotomous or categorical variables are prepared and compared among groups, geographic area, time period, as well as against norms. Missing value percentages are calculated by group, time period and geographic area for each risk factor. The mean number of claims per day and mean dollars per claim (this can be Winsorized) are calculated by group, time period and geographic region. Large discrepancies in the number or average claim size is reviewed and analyzed to uncover data errors. The ratio of charges to payments is calculated by group, time period, and geographic region and compared with norms.

810 Aberrant results are evaluated to determine if there is an error. If data cannot be corrected or replaced, those people are dropped from the model universe.

812 The model universe is left and ready for final preparation for analysis.

FIG. 9 is a flowchart of processing steps for developing cost forecasting models based on "inlier" data in steps 106, 204, 210, 304 or 310 of the methods of FIGS. 1-3. Processing blocks of FIG. 9 are described as follows:

901 A clean analytic database is required as the modeling universe. Otherwise, spurious results will lead to idiosyncratic, non-reliable models or, at best, weakly predictive models.

902 The modeling universe database is separated into Winsorized data (i.e., inliers) and the outlier data. There is an "inlier" model with the dependent variable Winsorized and an "outlier" model that uses the difference between the actual claims next period and their Winsorized values. The independent variables are similar for the inliers and outliers. It has been found that models are more accurate when average payments per day is used as the dependent variable and average charges per day as predictor variables (and components of it such as the lowest ten months average charge per day). Cost per day adjusts for persons not enrolled for a complete year.

The Winsorization point is typically selected as the top 5% of payments per day. If that value is $55 per day, then the inlier model uses a value of $55 per day as the dependent variable for people with greater than or equal to $55 per day in payments. People with under $55 per day in payments do not have their dependent variable changed.

The database for the outlier models flags people with next period payments greater than or equal to the Winsorization value (e.g., $55 per day). If they are at or over the Winsorization amount, the flag equals one and zero otherwise. Also, the actual payments per day next period less the Winsorization amount is calculated. If it is negative, the outlier payment is set to zero.

903 The Winsorized modeling universe database is separated into two separate components: those individuals with claims in the base period and those individuals without claims in the base period. Those without claims have only demographic risk factors whereas those people with claims have a payment history and clinical information as additional risk factors. Those without claims are on average lower in risk than those with claims.

904 The no claims database includes demographic variables, such as age and the family relationship to the enrollee plus risk factors from the enrollment file.

906 People with claims in the base period also have the enrollment file risk factors plus those risk factors derived from the claims file.

An example of a program segment to run OLS regression model on inlier with is as follows:

---

```
*** '5th root of winsorized cost is DEP measure ';
***OLS MODEL;
    proc reg data='DATA WITH CLAIMS' outest='OLS 1st MODEL FOR LAD CART';
        exp9olsd : model w5_6850 = ensagen
                        sq5chg1 sq5chg2a sq5chg2b sq5oth      agesq
                        h5bchg1 h5bchg2a h5bchg2b ten5moch
                        zeroa zerob zerooth enrldayb
                        hibymos1 hibymos2 hi1dvby hi2dvby
                / selection=stepwise selection=backward details;
run;
    proc score data='DATA WITH CLAIMS' score='OLS 1st MODEL FOR LAD CART'
               out='DATA WITH CLAIMS' type=PARMS predict;
        var ensagen      sq5chg1 sq5chg2a sq5chg2b sq5oth      agesq
                         h5bchg1 h5bchg2a h5bchg2b ten5moch
```

```
              zeroa zerob zerooth enrldayb
              hibymos1 hibymos2 hi1dvby hi2dvby;
run;
***CHECK RESULTS;
proc means data='DATA WITH CLAIMS'  ;
class modeled;
var w5__6850 exp9olsd ;
proc corr data='DATA WITH CLAIMS'  ;
var w5__6850 exp9olsd ;
where modeled eq 'YES';
```

908 The initial person-level model for people with claims uses the continuous independent variables only. Examples include the age, number of days enrolled in the base period, charges in the peak spending month, and average charge per day in the lowest ten months. The dependent variable is the Winsorized payment per day (or a transformation of it such as the fifth root) in the next period. An ordinary least squares (OLS) model has been used. Other forms of regression models (e.g., median or robust) or neural networks could be used. The example given in the software in the CD-ROM Appendix does not include this step, but the program above does provide an example. This step can be important when there are several numerical candidate predictor variables.

910 The expected payments per day from the previous step is used as an input to the next model along with the categorical variables (e.g., sex, site of care, diagnosis, etc.) We have found that a regression tree is a very effective method for capturing the interactions between the clinical variables and the amount charged in the base period. The CART software with the median regression tree option has produced the best results to date. Other forms of data mining (e.g., rule induction, clustering, genetic algorithms, neural networks) could also be used. The key is to capture the interactions between base period charges and both clinical and demographic risk factors. An example of a Program to run CART median regression tree using expectations created from OLS regression (see 910) and other risk factors is found in Appendix A.

912 A CART median regression tree or other data mining technique is used to model the "no claims" Winsorized database. The first model (i.e., the one for continuous variables used in 908) is omitted since none of the continuous variables derived from claims are available for this universe other than age or length of enrollment. This model uses the same statistical techniques as 910 but its independent variables are limited to those that can be derived from the enrollment file. The output from the regression tree (terminal nodes) identifies groupings of people that have homogeneous next period payments.

914 The regression tree terminal node's groups people with similar median payments next period. A set of dummy variables is developed that identify people in each terminal node. These dummy variables, the variables that were used to form the dummy variables, and the significant variables from 908 are entered into a final prediction model. We have used OLS, but other techniques, such as median or robust regression, neural networks or other modeling methods could be used instead. The result of those models is an expected payment per person per day in the next period. This only includes the Winsorized portion of the payments for people with claims in the base period. An example of a program to run OLS regression using terminal nodes from regression tree and other important risk factors from the tree (see 910 and Appendix A) is found in Appendix B.

916 The same technique as 914 is applied to the model output from 912. The result of this model is the expected payments per day for next period for people that do not have claims in the base period.

918 Model testing can be done at this point or after each step in the modeling process (i.e., after 908, 910, and 914 for models for people with claims). It is probably more efficient done after the final step. There are five criteria that are used in model evaluation in the illustrated embodiment: the mean absolute residual, $r^2$, accuracy measure (previously defined), bias, and cross validation. Mean absolute residual, accuracy measure (previously defined) and $r^2$ are related to the accuracy of the forecast. Bias refers to systematic over or under prediction when cases are sorted by their expected value. Regression models can be biased but regression trees are not biased. Cross validation refers to the accuracy of the models when they are applied to different sets of data. The tree software tests for cross validation. Hold-out samples can be used for testing the entire hybrid models. An example of a Program to run bias test, mean absolute residual, and $r^2$ analyses (examples of model testing) is found in Appendix C.

920 The same tests of the quality of the models are applied to the models developed on people without claims in the base period. The model tests are probably most efficiently applied after the final model is developed (i.e., 920). These models will have far less predictive accuracy than the models covering people with base period claims since there are fewer risk factors and the variability in next periods payments is not very predictable.

FIG. 10 is a detailed flowchart of process steps for developing cost forecasting models based on "outlier" data of the Winsorized data for the steps 106, 204, 210, 304 or 310, of the methods of FIGS. 1-3. The illustrated processing blocks of FIG. 10 are described as follows:

1002 The outlier database has next period's payments of zero for everybody whose payments were below the Winsorization point and the amount above the Winsorization point for everybody else. The outliers can have very high cost per day so the variability is very large. Therefore, we have chosen to model the outlier portion separately. This two step approach leads to more accurate and stable results since the extreme outliers are almost impossible to predict accurately.

1004 People with base period claims are modeled separately as they have risk factors not available with people without base period claims (e.g., diagnosis and amount charged).

1006 People with no base period claims are modeled separately since they only have risk factors available from the enrollment file.

1008 The same continuous risk factors available for 908 are used to model the probability of these people having payments above the Winsorization point. The dependent variable is 1 if the total amount of next period's payment is above the Winsorization point or zero otherwise. A logistic regression is used to estimate the probability of each person's next period's payments exceeding the Winsorization point. Other types of regression models (median or robust), neural networks, or other predictive modeling can be used instead of logistic regressions.

A program to run logistic regression probability model on outliers with claims follows.

```
**HILO is the 1=Outlier, 0=Inlier;
    proc logistic data='DATA WITH CLAIMS' outest='LOGISTIC WEIGHTS';
            exphilo : model HILO=ensagen
                            sq5chg1 sq5chg2a sq5chg2b sq5oth    agesq
                            h5bchg1 h5bchg2a h5bchg2b ten5moch
                            zeroa zerob zerooth enrldayb
                            hibymos1 hibymos2 hi1dvby hi2dvby;
;
        proc score data='DATA WITH CLAIMS' score='LOGISTIC WEIGHTS'
                out='DATA WITH CLAIMS' type=PARMS predict;
                var ensagen     sq5chg1 sq5chg2a sq5chg2b sq5oth    agesq
                            h5bchg1 h5bchg2a h5bchg2b ten5moch
                            zeroa zerob zerooth enrldayb
                            hibymos1 hibymos2 hi1dvby hi2dvby
;                run;
run;
data 'DATA WITH CLAIMS';
set 'DATA WITH CLAIMS';
exphilo=exphilo*'mean of outliers';
```

1010 The model is tested for accuracy using the criteria described in 918. Note that the probability of each person being an outlier is being modeled rather than classifying each person as an outlier or not an outlier. All of the techniques from processing block 918 of FIG. 9 are applicable.

1012 A regression tree is used to refine the estimated probability of being an outlier. The dependent variable is the same as 1008. We recommend a least square regression tree but other types of predictive models could be used that capture interactions (e.g., neural network, rule induction or genetic algorithms). The expected value from the logistic regression plus all of the categorical risk factors from the claims data and enrollment file are used as candidate independent variables (See 910). The output are terminal nodes of a least squares regression tree that have homogeneous probabilities of being an outlier. The probability of each person is determined by their terminal nodes. Note that this is not a classification tree.

A program to run CART least squares probability tree on outlier with claims data using expectations from OLS regression (see 1008) and other risk factors is found in Appendix D.

1014 The same methods are applied to the people with no claims data (See 1012). The output are groupings of people with homogeneous probabilities of being an outlier.

1016 and 1018 The models are tested for accuracy, bias and cross validation as the models were tested in 918.

1017 and 1019 The terminal nodes and risk factors defining those terminal nodes are used as input into another logistic regression or other forecasting technique (see 914 and 916). The examples in Appendix E are for 1017 since it includes data from claims.

1020 and 1022 For each terminal node, the median payment above the Winsorization point next period is calculated. When the medians are not significantly different, the terminal nodes (mean above the Winsorization point) are combined for additional stability. Note that the probabilities are not combined. The means are calculated arithmetically for the people in the combined terminal nodes and for those kept in separate nodes due to their distinctive median dollar costs. The means are then multiplied by the respective probabilities for each person giving the expected outlier payments for each person. The probability from the logistic regression (see 1017 and 1019) is used rather than from the regression tree. People are "tagged" with their respective terminal nodes (see 1012 and 1014) so that the correct mean is multiplied by the probability.

1024 The inlier Winsorized cost forecast and the expected cost of the outlier portion are summed to give the total expected cost for next period.

The process of scoring the data refers to applying the model to a set of data. The data need not be the same data on which the model was developed. However, it is best if the weights are derived from that client's book of business. The data need to have the same risk factors coded on it that were included in the models of the probability of being an outlier and those used for the expected inlier payment calculations. Also, the models must be applied to the universe of people that were defined using the same criteria that were used to define the model universe. The model gives a set of weights applied to individual risk factors or combinations of risk factors yielding the expected payments or probability. Most statistical packages or data mining software have automated methods for scoring data once the risk factors are properly coded.

Illustrated in FIG. 11 is a detailed flowchart for scoring, testing and integrating the data, and adjusting for cost trends for use in steps 106, 204, 210, 304 or 310 as well as 108, 208 and 306 of the methods of FIGS. 1-3. The description is written as steps in developing the model so the data are referred to as the base and next periods. The application of the model to the actual underwriting data is essentially the same and it produces the policy period expected cost. The respective processing blocks of FIG. 11 are described as follows:

1102 The probability of a person being an outlier (i.e., with policy period payments greater than the Winsorization point) is calculated for all people without claims. Their probabilities will be lower than those with base period claims.

1104 The mean for each terminal node or group of terminal nodes (block 1022 of FIG. 10) is multiplied by the associated probability. This calculates the amount over the Winsorization point that each person is expected to cost in the next period. This gives the expected outlier dollars per day for each person. The mean expected dollars per day for each person is well below the Winsorization point.

1106 and 1108 The exact same process is applied to the outlier probability model and mean policy period payments for people that have base period claims. The expected value is calculated by multiplying the probability by the mean.

An example of a Program to score the outlier with claims data (see 1017) is as follows:

```
proc score data='data from cart' score='logistic output ' out='data with claims'     type=PARMS predict;
    var ensagen agesq exp9olsd exp9sqd
                            sq5oth   ten5moch dxresp othdiges
                            hi2dvby dxdigest dxcircul tnde5ls1
tnde5ls3-tnde5ls5  ensxkd1a ensxkd2b ensxkd3c ensxkd4d ensxkd6f;    run;
run;
data 'DATA WITH CLAIMS';
set 'DATA WITH CLAIMS';
expprob=hilols*'mean of outliers';
```

1110 and 1112 The expected next period inlier (less than or equal to the Winsorization point) payments are added to the expected next period outlier payments to produce the total expected payments in the next period for people with no claims (from 920) and for people with claims in the base period (from 918). The following program is an example of scoring inlier data with claims.

```
Program to run scoring of inlier with claims data (output from OLS regression
see 914)
***score ALL data;
    PROC score data='DATA WITH CLAIMS' score='OLS regression scores' out='DATA
WITH CLAIMS' type=PARMS predict;
        var  ensagen agesq exp9olsd exp9sqd
            sq5oth   ten5moch dxresp othdiges
            hi2dvby dxdigest dxcircul td5lad2-td5lad13
            ensxkd1a ensxkd2b ensxkd3c ensxkd4d ensxkd6f       ;
run;
run;
title2 'REPORT TO REVIEW SCORED DATA With model universe';
PROC means data='DATA WITH CLAIMS' ;
var  wins6850 expols1s exp5rLAD exp5rtLs ensagen agesq exp9olsd exp9sqd
                            sq5oth   ten5moch dxresp othdiges
                            hi2dvby dxdigest dxcircul td5lad2-td5lad13
ensxkd1a ensxkd2b ensxkd3c ensxkd4d ensxkd6f;
    where exp9olsd ge 1.15;
```

1114 This database includes everybody that was included in the modeling universe (i.e., the standard population). However, there are people that were enrolled next period but not included in the modeling universe.

1116 When everybody included in the modeling database is combined, the sum of the expected payments per day next period should equal the actual payments. Addition model testing is performed at this point. The same methods (see 918 and 920) that were used to test the models developed on subsets of the modeling universe are reapplied now. This summary testing is even more important than testing the components of the complete model.

1118 There are three categories of persons used for which insurers will be at risk during the next period but who are excluded in the modeling database (i.e., the standard population).

1. Persons enrolling during the lag period
2. Persons enrolling during the next period
3. Persons terminating during next period a. in 1 or 2 above
b. other categories For those in categories 1 or 2, no base period claims data are available when the rates must be developed and offered. Consequently no model predictions can be made for them. However, we know their actual payment costs during next period. The following tabulations will show if any adjustment in expected next period costs is needed for them.

Compare the next period actual costs per persons per day for those in categories 1 and 2 with both the expected next period cost per person per day and the actual next period cost per person per day for those in the following categories (note that these are detailed examples of subscriber units that could be used for pricing also):

Subscriber only
Subscriber and spouse
Subscriber spouse and 1 dependent
Subscriber spouse and 2+ dependents
Subscriber and 1 dependent, no spouse
Subscriber and 2+ dependents, no spouse Because outlier next period costs may distort these findings, the following quantities of costs per person per day should also be compared to reduce the effects of outlier.

Median
75th percentile
90th percentile

If there are no significant differences between the excluded and included categories of persons, no adjustment is needed. For those categories for which there are significant differences, the adjustment factor will be (excluded category mean next period cost/day) divided by (included category mean next period cost/day).

The number of persons in category 1 can be determined for those who actually enrolled in the lag period while the number in category 2 can be estimated from underwriting period data. The final adjustment factor will be the product of the per person adjustment factor (as above) and the proportion of all next period person days estimated to be comprised by those in category 1. The proportion of next period person days comprised by those in the model will have an adjustment factor of 1.00.

The use of these adjustment factors can be further refined by applying them separately for sets of insured groups which have similar adjustment factors, instead of applying one adjustment factor to all groups.

Additional adjustment for those in category 3a above is not required since these persons experience will be included in the adjustment for those in categories 1 and 2. Those persons in category 3b will be included in the population used as the standard for our overall risk models. They can thus be scored by their base period attributes, and their next period expected costs can be estimated from the described models. We can thus score them by their base period attributes and estimate their next period expected costs from our models. These can then be compared to the actual next period costs per person per day, in total and by the subscriber family categories listed above.

After checking for the influence of outliers, any subsets with actual values differing significantly from expected values can be the basis of adjustment. The proportions of person days in category 3b can be estimated from the available data.

As noted above, separate adjustments can be made to expected next period costs for groups which have similar adjustment component factors.

1. actual to expected costs
2. proportion of next period person days attributable to those in category 3b There may well be an interaction in these two factors.

1120. The database of all people covered next period is compiled next. A flag is set to one if the person has an expected payment next period that was calculated from the risk adjustment models. Only the new joiners in the lag period or next period cannot have an expectation calculated from the risk adjustment model.

1122 When this product is used for an application of prospective pricing for insurance coverage, the future cost of health care needs to be included. The risk adjustment models include the historical cost trend since it was present in the data. In other words, no additional adjustment was required for the modeling since the model uses the base period to forecast next period's payments so the cost trend inherent in the data is built into the model. Note that with a 3 month lag period, this is a 15 month cost trend. If the future annual cost trend is expected to be identical to the cost trend between the base period and the next period, then no further adjustment is needed since it is already incorporated in the data and model. If the future cost trend is different from the cost trend implicit in the data used for model development, the ratio of the future cost trend divided by the model period cost trend should be used as an adjustment.

All health insurance companies use an estimate of the future medical cost trend to increase future expected claim costs to what they expect them to be in the policy period. The simplest group-level cost forecast for a credible group is last year's cost multiplied by cost trend producing the "experience" forecast. The CI will provide a cost trend forecast for use in this invention. The development model has an implicit cost trend built into it since it was present in the model development data. Therefore, the development model must be detrended and then the CI's cost trend forecast can be applied to the person-level cost forecast when the model is applied to the underwriting period data. In order to detrend the development model, we calculate the cost for a standardized population for the book of business in the base and next periods. The standardized population assumes a specific mix of demographics in the CI's book of business for the base and next periods. A particular embodiment would calculate the proportion of cost in each of the following categories: male employee; female employee; male spouse; female spouse and other dependent cross-classified by 5-10 age categories (e.g., <5, 5-17, 18-24, 25-34, 35-44, 45-54, 55-64, 65-74, 75+). This particular classification would produce up to 40 demographic cells. Other classifications could be used. Too many cells will cause a loss of robustness in the estimates. The mean cost per person per cell in the next period divided by the associated mean cost in the same demographic cell in the base period calculates the cost trend per cell during the model development period. One method to standardize the population in order to produce a single cost trend for the entire book of business is to weight each cell by the proportion of cost it accounts for in the base period. The weighted average of the cells' cost trend is a summary cost trend for the book of business for that standard population for the time period between the base and next periods. If those periods are contiguous and one year each, the annual development model cost trend has been calculated. Otherwise, an adjustment must be made for the time periods to calculate an annual trend. If the base, lag and next period are each one year, the square root of the cost trend will calculate the annual cost trend since the trend compounds. If the lag period is three months and the base and next period are one year, the fifth root of the cost trend is the three month cost trend. The three month cost trend is taken to the fourth power to calculate the annual cost trend. To apply the CI's single number cost trend (which will be an annual trend), the reciprocal of the annual development model cost trend is multiplied by the CI's annual cost trend to calculate the cost trend that should be applied to the underwriting period data after application of the development model. This method works for first dollar medical insurance, aggregate only medical stop loss and reserving for those insurance products.

The development model next period data need to be detrended and then retrended with the CI's cost trend forecast prior to calibrating the development model for specific stop loss coverage or aggregate stop loss in combination with specific stop loss coverage. Once those adjustments are made, additional cost trend adjustments do not need to be made before applying the specific or aggregate in combination with specific stop loss models to the underwriting period data to forecast the policy period costs.

Alternatively, the CI may have cost trend calculated separately by geographic locale or by provider type (e.g., drugs, physician, inpatient hospital). If the CI's cost trend is specific to each geographic locale, the same method of demographic cell adjustments can be employed as previously described but a separate table is calculated for each geographic locale. The CI's locale specific cost trend is applied to the cost trend estimated for the model development period using the standardized population adjustments for each locale. Each locale's detrending and retrending is applied to the underwriting data for that locale to calculate the policy period cost for that locale.

If the CI's cost trend forecast is by provider type, we need to estimate the development model trend by provider type so that the policy period forecast will be appropriately detrended and retrended. This can be done by cross-classifying the demographic cells by provider type costs for the base and next periods and calculating the provider type trend for each demographic cell separately by provider type. The provider type cost trend by demographic cell are combined by weighting by the proportion of base year cost by each by the proportion of total cost for that demographic cell for each provider type separately. This calculates a provider type cost trend for the base to next period for the entire book of business. The CI's forecast cost trend by provider type is multiplied by the reciprocal of the model development cost trend for the same provider type. This adjusted cost trend by provider type is multiplied by the cost forecast for each terminal node by the associated cost by provider type in the policy period and then summed across provider type by person to calculate the policy period forecast cost per person. The associated cost in the policy period by provider type is calculated by multiplying the proportion of cost by provider type in the next period by terminal node by the total forecast cost for the policy period for that terminal node.

1124 The person-level inflation adjusted forecasts are summed by group and actual is compared to forecast. The group-level models make adjustments when the actual is different from forecast.

The underwriting period data are scored using the model developed on the base and next periods. Risk factors need to be calculated for the underwriting period data in order to apply the model. The summed scored data, with appropriate cost trend assumptions, produce the expected policy period costs or actual expected cost for the policy period using the person-level models.

FIG. 12 is a detailed flowchart illustrating processing steps for developing group-level models and making adjustments to the summary of the person-level data of steps 106 and 108 of FIG. 1, 204, 208 and 210 of FIG. 2, or 304, 306 and 310 of FIG. 3. The steps are similar to the person-level modeling steps. First the development model is calculated using the base and next period data. The model is then applied to the underwriting period data (i.e., scoring the data) to forecast the policy period costs. With the group-level model there is the model development using the base and next period and then the risk factor coding and scoring of the underwriting period to produce the estimated policy period costs for pricing the policy. The processing block descriptions for FIG. 12 are:

1202 There are likely to be characteristics of insured groups which can influence the group's costs of care over and above that based on the characteristics of the persons in the insured groups. For this reason we develop a model to identify such intergroup differences and a way of applying the model's results to adjust each groups expected payments from the models based on individuals. First, the person-level expected payments are summed by group.

1204 The group-level development models have the following characteristics:
 Unit of observation—the "group"
 Dependent variable—Next period residual dollars per person per day in the group (i.e., group total next period actual payments less Group total next period forecast payments divided by the number of people in the group divided by 365 days)

Candidate predictor variables are coded and include the following
  Benefit attributes
   alternative insurance plan
   deductible
   co payment
   exclusions
   dependent coverage
  Benefit plan type: indemnity, PPO, POS, lock-in HMO
  Payment type: fee for service or capitation
  Demographic cells: proportion in age range by relationship by sex
  COB in Base period
  Capitation payments by provider type
  Number of subscribers
  Average family size and proportion in each family composition class
  SIC code
  Geographic locale
  Actual mean payments in base (underwriting) period per person per day
  Expected mean payments in next (policy) period per person per day
  Percent of enrollees joining during base period or leaving during base period
  Payment carve outs for capitation—if specific types of are paid by capitation (e.g., primary care, obgyn), then risk factors need to be developed that will allow the group-level model to reduce the payments since the services are covered by the capitation payments. Dummy risk factors for the presence or absence of capitated payments by provider type will need to be included when all services are not covered by fee for service payments.

1206 A least square regression tree including selected interaction terms as predictors (other data mining techniques that develop and test numerous interactions such as neural networks, rule induction, genetic algorithms, clustering techniques or other methods could be used instead of regression trees) is developed on the group-level data. This second level of modeling makes adjustments for information not included at the person-level.

1208 An ordinary least squares model (other types of regressions, neural networks, or other types of predictive models could be used instead of the OLS regression) is applied to the predictor variables that were important in the model preceding this step. The candidate predictor variables include the terminal nodes as dummy variables and the main effects used to define the terminal nodes.

1210 The predicted values from the model in 1208 are the average per person per day error (i.e., residual) in the estimate of next period's payments for everybody in the group. This residual is added to each person's next period expected payments from the person-level models (subtracted if it is a negative value). The model is developed on historical data that have no need for a cost trend adjustment except to be annualized since the cost trend is in the data. When the models will be used for setting prices for the policy period, the inflation adjusted person-level next period payment estimates are used as input and the groups are scored using the group-level models. Risk factors are coded for the group using the underwriting period data and the groups are scored with the group-level model to produce the policy period expected group-level costs.

Alternatively, the MAP4HIP method can be used to forecast person-level cost for individual (or family) renewal health insurance. The same methods apply but there is no "group" other than the family. The cost for the individual family members are summed to produce the family-level forecast. A family-level model can be used for final cost adjustments. The family-level risk factors are family composition, benefit plan, geographic locale and other factors germane to the family rather than an employment "group".

FIG. 13 is a detailed flowchart of an embodiment of a price optimization procedure which may be used to carry out steps 110, 212, or 308 of FIGS. 1-3. The processing block procedures of FIG. 13 are:

1302—The group cost estimate is the final output from the cost estimation system (i.e., expected medical costs in the policy period). It is at the group-level and includes the inflation trend estimate.

1304—The CI provides three sets of inputs that are used in the price optimization. The first set of input is their expected probability of retaining the group if the group's price is increased a specified amount. Rate increases will not be negative, generally, unless there is medical price deflation. Many probability estimates are gathered with small changes in the price increase around the client's target profit and fewer more sparse estimates further from the targeted profit margin. The client needs to consider the group's historical costs, inflation, local competitive pricing, and other factors that influence the group's likelihood of accepting the various price increases. Another necessary input from the client is the administrative costs allocable to that group. This cost may be expressed as a percentage of the expected medical costs or in dollars per year. The final input required is a minimum expected profit or profit margin that is acceptable.

The following Table 3 is an example of price forecasting using probability of retention and other related input data for steps 1304, 1306, 1308 and 1310:

TABLE 3

Price Forecast Example

| Price Increase | Probability of retention | Ratio Admin to Cost | Next Year Price | Next Year Total Cost | Expected Profit |
|---|---|---|---|---|---|
| 0.00 | 0.95 | 0.25 | 1500 | 1375 | 118.75 |
| 0.02 | 0.92 | 0.25 | 1530 | 1375 | 142.60 |
| 0.04 | 0.90 | 0.25 | 1560 | 1375 | 166.50 |
| 0.06 | 0.85 | 0.25 | 1590 | 1375 | 182.75 |
| 0.08 | 0.80 | 0.25 | 1620 | 1375 | 196.00 |
| 0.10 | 0.73 | 0.25 | 1650 | 1375 | 200.75 |
| 0.12 | 0.68 | 0.25 | 1680 | 1375 | 207.40 |
| 0.14 | 0.63 | 0.25 | 1710 | 1375 | 211.05 |
| 0.16 | 0.58 | 0.25 | 1740 | 1375 | 211.70 |
| 0.18 | 0.53 | 0.25 | 1770 | 1375 | 209.35 |
| 0.20 | 0.45 | 0.25 | 1800 | 1375 | 191.25 |
| 0.25 | 0.35 | 0.25 | 1875 | 1375 | 175.00 |
| 0.30 | 0.25 | 0.25 | 1950 | 1375 | 143.75 |
| 0.35 | 0.15 | 0.25 | 2025 | 1375 | 97.50 |
| 0.40 | 0.05 | 0.25 | 2100 | 1375 | 36.25 |
| 0.45 | 0.01 | 0.25 | 2175 | 1375 | 8.00 |
| 0.50 | 0.00 | 0.25 | 2250 | 1375 | 0.00 |

The optimal price is $1740 per person or a 16% increase. Costs are expected to be $1375/person and there is a 58% chance of retaining the group. This yields $211.70 expected profit per person.

1306—The expected profit (or profit margin) is calculated by the following formula: expected profit=(probability of accepting price offered)×[((1+proportion price increase)×(price in previous period))−(expected policy year medical costs)−(administrative costs)].

This is the expected profit (margin is calculated by dividing by the group's price) and it is calculated for each rate increase and probability of retention or acceptance. The maximum expected profit is the largest amount (or the closest to zero if they are negative) calculated in the preceding step. The largest expected profit is compared to the client's minimum acceptable expected profit.

1308—If the expected profit is below the minimally acceptable, then the expected profit calculations are printed out and the underwriter may run additional analyses to test the sensitivity of the assumptions. Also, the price at which the expected profit equals the minimally acceptable profit is printed out. If the underwriter wants to modify the probabilities in the retention curve, those are changed and 1304 is repeated.

1310 If the maximum expected profit is greater than the minimum acceptable profit, then the price optimizing profit, its percentage increase, expected costs and profits are printed out for the underwriter along with the same output for non-optimal prices. The underwriter would offer the price that maximizes their profits.

Another consideration when pricing the product is the variability of the forecast cost for the policy year. Greater variability should carry an additional risk premium. Therefore, the standard error of the group's expected medical cost is calculated and printed also. SAS or S Plus regressions will calculate the variability of the mean or the standard error of the estimate of the policy year cost by combining the standard errors of the person-level forecasts. The price that provides a 90% (or some other high probability) chance of break-even is calculated using the standard error and printed. An underwriter can use the break-even with a high probability price and the relative standard error in negotiating price. If there is a large relative standard (e.g., standard error of group/average standard error), the underwriter would be less inclined to discount the price in a competitive market since the likelihood of a loss is increased. Code for a program to run a pricing example is found in Appendix F.

1312—If the underwriter does not want to modify the retention curve, the underwriter offers the group the price that produces the minimally acceptable profit for the client even if the group is expected to reject the offer.

1314 The final step in pricing involves translating the average price per person per day into a monthly price per subscriber unit (e.g., single person, enrollee with spouse, enrollee with two or more additional dependents—other subscriber unit constellations are also possible). Costs are traditionally presented in cost per member per month or pmpm. However, subscriber units are used for pricing and it is important that costs are rationally allocated to the subscriber units. The price is multiplied by 365/12 to calculate the monthly price (or rescaled for another time period). One alternative for pricing the subscriber units is to calculate the mean cost forecast per subscriber unit for the group and then inflate each mean subscriber cost by the average profit margin for the group (i.e., recommended optimal price/expected cost). The mean cost forecast per subscriber unit is calculated by summing the forecast cost per person for each person that is a member of that type of subscriber unit in the underwriting period and then dividing that sum by the number of subscribers of that type (not people) in the underwriting period. This gives the group's mean daily cost per subscriber for each different type of subscriber unit. Another pricing alternative is to set the price for the subscriber units that are considered to be very price sensitive just below the market price. The remaining subscriber units must then be priced so that the overall expected profit is maintained. That can be calculated by estimating the expected profit for the market priced subscriber units and subtracting it from the total expected profit for the group. The other subscriber units must account for the remaining profit requirement. Their price can be set so that the profit margin equals the remaining profit requirement by solving the following equation for price per subscriber unit: (total expected profit-market priced subscriber profit)=remaining profit=(number remaining subscriber units)×((price/remaining subscriber unit)−(mean expected cost/remaining subscriber unit)). Solving the equation provides an average price/remaining subscriber unit or (price/remaining subscriber unit)=((remaining profit)/(number remaining subscriber units))+(mean expected cost/remaining subscriber unit). If there are two or more remaining subscriber units, the price can be pro rated based on the average forecast cost/remaining subscriber unit. This approach can be used for pricing stop loss medical insurance also. Alternative allocation of profits to subscriber groups are possible. Those of ordinary skill will appreciate that the relation of expected cost to the terms of the medical insurance will vary among insurance types. For example, first dollar products will have a higher expected costs than stop-loss products.

Estimating costs that need to be considered for reserves for first dollar health insurance and for stop loss coverage are alternative uses for the cost forecasting process. Rather than predicting payments that will occur over the entire policy period, reserving requires predicting costs that will occur in the upcoming financial reporting period (e.g., fiscal year or quarter). The same cost forecasting process using data collection and validation, risk factors, data mining and statistical techniques at the person and group-levels, testing and reporting can be applied to produce cost estimates to be used in setting reserves. The dependent variable needs to be changed so that the reserving model is calibrated to the appropriate time period.

The model for reserving forecast's costs that have been incurred but not reported (IBNR) and this may include some costs of claims that have not occurred yet but are in the financial reporting period. Typically, the reserving period will run through the end of the current fiscal quarter or year. Inflation needs to be accounted for but the time period is far shorter than for the renewal cost forecast product, but the same techniques apply over the shortened time period.

A development period model is calibrated using the risk factors from the claims and enrollment data in a base period to forecast total incurred claims for the financial reporting period. The underwriting period for reserving can be the previous 12 months of claims (if available) preceding the reserving date or some other time period such as this policy period to the reserving date. The base period for the developmental model must have approximately the same number of days as the underwriting period so the forecast will not be biased. The policy period for IBNR claims begins at the first date of the financial reporting period and ends at the last day of the reporting period. The next period for the model development cost for IBNR or claims that have not occurred yet must be of the same length as the actual reserving period during the policy period for correct model calibration. This is a standard person-level model for MAP4HIP with a shorter next period (e.g., quarter) possibly. The total forecast claims are summed to provide a total claim amount forecast. This is used as an independent variable and is supplemented by additional independent variables that include the reported claims, historical completion rates by time into the reserving period, claims backlogs and seasonality. The total of the IBNR claims from the reserving period is the dependent variable. Note that this model is at the book of business level. A quarter will yield only one data point for the book of business. If there are too few quarters for developing a stable model, an alternative approach is recommended.

The alternative approach defines reserves as the difference between the total claim forecast for the reserving period and the incurred and reported claims during that period. In other words, the sum of the incurred and reported claims is subtracted from the total forecast claims and this equals the reserve forecast.

The reserving product can be delivered as a service bureau product or as software, either stand alone or an ISP model, using the same data flows as used with the cost forecasting models for fully insured or stop loss coverage. The pricing module is not relevant for reserving.

The fully insured medical product uses claims information as a critical component of the cost forecasting model. Claims are available if the group is renewing first dollar health insurance but not for a new group. Enrollment data may be available for new groups (possibly only for employees) or individual health insurance. The same process can be applied to new groups or individual (or family but called by convention individual) policies by using the method for the people with no claims and only enrollment data. The base period enrollment data must contain the same potential risk factors as are available for the new groups. Note that there is only one model since there are no claims data so people cannot be separated into claims and no claims people in the base or underwriting periods. The cost forecasting model should be developed on the client's current book of business. The dependent variable is next period's payments. The independent variables are the same as the risk factors used in the no claims model (i.e., detailed enrollment data only). The modeling universe includes everybody rather than only those with no claims. Sometimes claims data are available for high cost cases in the new group and also may include the demographics and diagnoses associated with those high cost cases. This information can be included as person-level risk factors but the same information will need to be included as potential person-level risk factors in the base period for the development model. A group-level model can be applied to the summarized group-level data as with renewal business. Frequently the total cost for the new group last year is available and may be used as a risk factor for the group-level model. The total group cost would then need to be included in the base period as a potential risk factor also.

The fully insured new business cost forecasting and pricing product can be delivered as a service bureau product or as software, either stand alone or an ISP model, using the same data flows as used with the cost forecasting models for fully insured or stop loss coverage.

Aggregate only medical stop loss insurance, such as Cap-Cost, can have different data sources than fully insured insurance (where the data is held and owned by the insurance company), as a TPA pays the claims and holds the data for the self-insured employer. It is our intent to get the data for all of the TPA's groups so that our client, the stop loss insurer, can bid on all of the groups serviced by the TPA. Therefore, any renewal business for the TPA can use the full cost forecasting models. New business for the TPA will not have claims data available. The enrollment data only new business model cost forecasting technique is applicable for new business for the TPA. The enrollment data are needed for the new group. Future refinements will include combining the historical payments, summarized by month or quarter, with the enrollment information since person-level claims will not be available.

In order to understand the performance of CapCost versus the traditional specific plus aggregate stop loss insurance, we had to create synthetic groups since our database only contained 116 actual groups of very different sizes. Monte Carlo random samples were developed for synthetic groups of 50, 100, 250, 500, 750, 1000, and 1500 employees plus their dependents. A group of 50 employees is smaller than the smallest employer in the target market and 1500 employees is toward the upper end of the target market for stop loss health insurance. Five hundred random groups were selected with replacement. All family members of the employees were included in the group. The claims payments were calculated for traditional $50,000 specific with 125% aggregate exclusive of specific and for CapCost 110™. CapCost 110™ is aggregate only at 110% of the attachment point. TruRisk models were applied to forecast next years claim payments. CapCost 110™ medical claims payments for groups of 50 employees is about 80% of the claims paid out for traditional $50,000 specific plus $125% aggregate stop loss. Once there are 250 or more employees the CapCost 110™ claims pay out is less than 50% of the traditional stop loss coverage. Similar results were seen for $25,000 specific and $75,000 specific An aggregate only policy can be underwritten using the group-level experience for credible groups. However, it is very important to accurately estimate the group's costs for next year since that determines the 110% attachment point. Therefore, the MAP4HIP cost forecasting method is recommended as the preferred embodiment since the predicted mean cost is more accurate than the predicted mean cost derived using the standard approach with group-level experience as predictor. The same steps are taken in developing the models for CapCost as are used with the general MAP4HIP process. The only difference is the variety of TPAs as multiple data sources versus one CI with fully insured medical. Person-level and group-level models are developed for cost per person per day. The risk factors, statistical methods and dependent variables are the same. The attachment point needs to be set to the appropriate amount (e.g., a 110% attachment point is calculated by multiplying the cost trend adjusted forecast cost by 1.1).

The aggregate only cost forecasting product can be delivered as a service bureau product or as software, either stand alone or an ISP model, using the same data flows as used with the cost forecasting models for fully insured coverage.

TABLE 6

|  | 250 employees | | 500 employees | | 750 employees | |
| --- | --- | --- | --- | --- | --- | --- |
|  | CapCost | $25,000 spec | CapCost | $50,000 spec | CapCost | $75,000 spec |
| total 500 groups | | | | | | |
| $/employee | 229 | 582 | 104 | 278 | 87 | 212 |
| std. dev. | 681 | 789 | 301 | 385 | 229 | 303 |
| group claims > 0 | | | | | | |
| % groups > 0 | 26.40% | 98.20% | 18.20% | 89.20% | 20.80% | 87.00% |
| # groups > 0 | 132 | 491 | 91 | 446 | 104 | 435 |
| $/employee | 867 | 592 | 569 | 311 | 419 | 243 |
| std. dev. | 1099 | 791 | 483 | 394 | 336 | 312 |
| minimum | 2.08 | 0.3 | 8.04 | 6.34 | 5.32 | 2.63 |
| maximum | 6479 | 7066 | 1823 | 1921 | 2027 | 2026 | both plus 125% aggregate coverage. The pay out for CapCost 110™ is much lower for $25,000 specific plus 125% aggregate and closer to the $75,000 specific plus 125% aggregate. The mean and standard deviation are presented in TABLE 6 for three different size groups. 125% aggregate is included with each of the specific coverage. The mean claims paid out are less with CapCost 110™ and the standard deviation is smaller than with traditional stop loss coverage. The main factor causing this is the far lower frequency of claims with CapCost 110™ (18-26% of groups) as compared to traditional specific plus aggregate coverage (87-98% of groups). When a claim was made with CapCost 110™ coverage, it was greater and the standard deviation was also greater than for claims with traditional stop loss coverage.

The claims paid out for CapCost 110™ and traditional stop loss are highly correlated:

R=0.95 for 250 employees with $25,000 specific and 125% aggregate

R=0.91 for 500 employees with $50,000 specific and 125% aggregate

R=0.87 for 750 employees with $75,000 specific and 125% aggregate

The risks or claims paid out are correlated but lower for CapCost 110™ since the claim frequency is far lower with that coverage.

The MAP4HIP method can be used for cost forecasting for specific stop loss coverage. Specific stop loss pays for claims above a specified threshold (i.e., the deductible). Those claims costs can be forecast using the same techniques that MAP4HIP uses for forecasting outlier amounts. First, the forecast inflation or cost trend adjustment for the policy period must be applied to the model development data. This is a different order of steps from the standard MAP4HIP sequence but it is necessary due to the specific deductible. For example, if there is a $50,000 deductible and a 10% cost trend then a $50,000 claim in the next period would yield a $0 specific claim. If that claim occurred in the policy period after 10% inflation it would produce a $5,000 specific claim ($50,000×1.1=$55,000 subtracting the $50,000 deductible yields a $5,000 specific claim). Inflation during the lag period must be added also and inflation built into the development model must be divided out to provide accurate future cost estimates for modeling specific claims. After the inflation adjustment for the next period data, costs are then recalculated so that they are zero if the person's claims are below the deductible in the next year (similar to Winzorization). If costs total above the deductible, then the specific cost is set to that amount. Probability models are developed for claims and no claims people in the base period. The probabilities are weighted by the average cost in the terminal node (above the deductible) to produce the expected cost. The person-level forecasts are summed to make the group-level forecast. Group-level models with the same risk factors as MAP4HIP are developed using the residual of the actual specific payments per person per day minus the forecast specific costs. After development period models are complete, they can be applied to data from an underwriting period to develop cost forecasts for a policy period.

Aggregate stop loss is frequently added to specific coverage. The aggregate coverage with specific coverage is paid exclusive of specific claims and specific claims are not used in defining the attachment point. Therefore, aggregate stop loss (with specific coverage also) claim amount can be modeled using the inlier methods in the MAP4HIP method. The Winsorization point is the specific deductible. As with specific, the cost trend forecast for the policy period must be applied to the next period data prior to the inlier calculations. Only inliers are modeled since the specific costs will be borne by the specific coverage. Both the specific and aggregate with specific should be modeled and priced separately. Note that this is different from aggregate only stop loss coverage since all costs contribute to the attachment point and aggregate claim amount for aggregate only stop loss coverage.

The specific cost forecasting and specific plus aggregate cost forecasting products can be delivered as a service bureau product or as software, either stand alone or an ISP model, using the same data flows as used with the cost forecasting models for fully insured coverage.

Group short term disability insurance (STD) is insurance that pays a portion of an employees wages (typically 50-100%), a flat amount or the lesser of the portion or the flat amount when an employee is disabled due to a non-work related accident, sickness or pregnancy. The duration of the salary replacement is typically 13, 26 or 52 weeks. The MAP4HIP method can be applied to forecast STD payments with a few modifications. The potential risk factors are the same as the risk factors used with medical insurance and described in section 806 with the additional risk factors of number of STD days and payments in the base and underwriting periods and job classification when these data are available. Otherwise, the exact same potential risk factors as used with MAP4HIP can be linked to the STD days next year and modeled using the MAP4HIP modeling techniques and processes. The dependent variable in the model development database is the number of STD days in the next period. In other words, the medical claims and STD days in the base period are linked in the database to STD days in the next period for the same person and a STD day forecasting model for the next period is developed. The interaction capturing techniques and other modeling methods are the same as for medical claims but it is unlikely that the data need to be Winsorized and outliers modeled separately since STD is capped at a short period. The development model is applied to score the actual underwriting period data to calculate the expected number of STD days during the policy period to calculate the forecast claim amount. The expected number of STD days needs to be weighted by the expected cost per STD day. This can be calculated by averaging the STD cost per day in the underwriting period and increasing it by wage inflation and multiplying it by the expected number of STD days. Alternatively and preferably, each person's salary or flat rate benefit is linked to the database and the forecast STD days are multiplied by the STD per day benefit amount (i.e., portion of salary covered by STD) and increased by the salary inflation history. The STD cost per person is summed to produce the group's expected cost. Confidence bounds can be calculated for the number of expected STD days to provide a range of high to low cost for the group. A group-level model is built using the same group characteristics as with MAP4HIP and possibly supplemented with characteristics of the benefit plan. The group-level dependent variable is residual STD days per person weighted by the mean cost per person per day to calculate the forecast claim amount.

The STD cost forecasting product can be delivered as a service bureau product or as software, either stand alone or an ISP model, using the same data flows (with STD days and salary information added) as used with the cost forecasting models for fully insured coverage.

Long term disability insurance (LTD) is wage replacement insurance for disabilities that run longer than STD coverage and may continue until the insured is 65 years old. Group LTD coverage is for a policy period that is typically one year. The insurer does not bear the cost of continuing disability liability from previous periods unless it was the insurer for that period also. The insurer will bear the cost for new long term disabilities that occur during the policy period and will continue to be responsible for that cost until the coverage expires (e.g., the beneficiary dies or turns 65 years old) or the beneficiary can go back to work. The probability of a LTD claim occurring during the policy period (i.e., the dependent measure) can be modeled and forecast using linked medical and LTD claims at the person-level. The base period risk factors are the same as the STD model, including medical claims, and STD claims with the addition of LTD claims linked, recoded and used as supplemental risk factors when available. The forecasting model can be built using only medical claims and enrollment information. Logistic regression, regression tree or hybrid tree with terminal nodes feeding into a logistic regression (the hybrid tree being the preferred embodiment) are the statistical techniques for modeling the incidence rate of LTD claims during the next period (typically one year). Other interaction capturing techniques can be used to predict the incidence rate but must be appropriate for modeling a variable that is bounded by 0 and 1. The development model is applied to underwriting period data to calculate the expected probability of a LTD claim during the policy period. The probabilities need to be weighted by the expected net present value of the disability to estimate the total cost of the disability (i.e., the claim amount). The net present value of the disability cost is obtained from actuarial tables. The expected costs are summed across the group members to produce the expected group cost. The net present value needs to be derived from other databases and should be conditionalized on the cause of the disability since the cost will vary depending on the cause. The cause of the disability can be estimated by the clinical conditions defining the terminal node of the person. A more accurate total cost of the disability will be calculated if the weights are conditionalized on the cause of the disability.

If a good estimate of the net present value of the future cost or length of the disability is not available for the various terminal nodes, then an index can be calculated. This index is the expected number of new disabilities for the group during the policy period divided by the "average" number of disabilities calculated using standard actuarial techniques for new business for LTD. A confidence interval can be calculated for the expected number of disabilities using the expected probability of disability per person and computing the upper and lower bounds for the group by using a Lexian distribution that calculates the exact probabilities. A binomial distribution can be used but the confidence interval will not be exact since it assumes that everybody has the same average probability within the group. Group's that have a confidence interval that does not cover the "average" calculated from standard actuarial techniques are significantly higher or lower in risk and should be priced differently than the average group. Alternatively and preferably, the group's standard deviation from the mean expected number of LTD cases can be calculated using on of the distributions above. The number of standard deviations from the mean is a scale that can be used for pricing. The end points of the scale can be anchored by market prices for the lowest and highest risk market prices or by actual historical LTD experience, conditionalized on group size.

The LTD cost forecasting product can be delivered as a service bureau product or as software, either stand alone or an ISP model, using the same data flows (with the addition of STD and LTD claims and salary information) as used with the cost forecasting models for fully insured coverage.

Group term life insurance is very similar to group disability, it is for a policy period (usually one year) and the coverage and rates are typically not guaranteed beyond that period. Unlike LTD, the death benefit is a one-time payment for a known amount (the amount is usually a multiple of salary up to a limit) so there is no uncertainty over the size of the benefit. Therefore, knowing the expected number of deaths (weighted by the amount of the life insurance) will provide an accurate estimate of the cost of that group. Alternatively, a relative risk index can be calculated in the same manner as with LTD. The numerator is the expected number of deaths (possibly weighted by the death benefit) and the denominator is the "average" number of deaths (possibly weighted by the death benefit) where the average is calculated using the age by sex distribution and standard life tables calculated by actuaries. The significance of the index can be calculated using the Lexian (preferably) or binomial distributions for the person-level probabilities and testing if the average is covered by the confidence bounds for the group. Groups with expected numbers of deaths outside the average should have higher or lower rates than average. Groups with large confidence intervals should be charged more than groups with small confidence intervals, all other factors being equal.

The same approach for developing the person-level probability models is used for life insurance as is used for LTD. Medical claims from a base period are linked with deaths occurring in the next period for a very large block of business. The risk factors are the same as or developed using a similar technique as used with the medical cost forecasting models. The dependent variable is the probability of death. The same interaction capturing techniques used for the LTD probability model are used for the life insurance model (i.e., the preferred embodiment is the hybrid probability tree). The developmental model is applied to medical claims during an underwriting period and death forecasts are calculated for the policy period. The probability of death is weighted by the death benefit to calculate the forecast claim amount per person. The claim amounts are summed across people in the group. A group-level model can be developed that uses the sum of the probabilities (i.e., the number of expected deaths), actual number of deaths in the base period and the number and amount of STD and LTD claims to supplement the risk factors used in a standard MAP4HIP group-level model, when available. Otherwise, the same medical claims and enrollment information used with MAP4HIP will suffice. The dependent measure is the forecast number of deaths and is weighted by the expected death benefit per person to calculate the forecast claim amount.

The group term life insurance death rate and claim amount forecasting products can be delivered as a service bureau product or as software, either stand alone or an ISP model, using the same data flows (preferably supplemented with the addition of death and salary information) as used with the cost forecasting models for fully insured medical coverage.

While the present invention has been described with respect to specific embodiments, it will be appreciated that various alternatives and modifications will be apparent based on the present disclosure, and are intended to be within the spirit and scope of the following claims.

The invention claimed is:

1. A computer-implemented process for developing models for forecasting future person-level health care costs for use in underwriting health insurance comprising the steps of:
   storing in a computer readable memory historical health care claims data and enrollment data for a plurality of people for each of a base period and a next period separated by a lag period, where the person-level health care claims data comprise at least a claim code and a claim amount;
   programming a computer processor associated the computer readable memory with risk factor definitions that assign risk factors;
   processing with the programmed computer processor the base period health care claims data and enrollment data to for each of the plurality of people to assign at least one claim based risk factor from the base period claim codes and at least one enrollment based risk factor from the base period enrollment data;
   storing the risk factors assigned to each of the plurality of people in the computer readable memory;
   programming a computer processor associated with the computer readable memory with at least one interaction capturing technique;
   processing with the programmed computer processor the risk factors assigned to the plurality of people with the interaction capturing technique to determine the ability of individual risk factors and combinations of risk factors to forecast the health care costs associated with the plurality of people in the next period;
   storing the determined abilities in the computer readable memory;
   programming a computer processor associated with the computer readable memory to select a plurality of risk factors having the greatest ability to forecast next period person-level health care costs;
   storing the selected risk factors; and
   processing with the computer processor selected risk factors to generate a model comprising a combination of the selected base period risk factors and the associated logical and mathematical operations that when applied to those risk factors predicts person-level health care costs in the next period.

2. The computer-implemented process of claim 1, wherein the interaction capturing technique is selected from the group consisting of median regression tree techniques, least square regression tree techniques, rule induction techniques, ordinary least squares regression techniques, median regression techniques, robust regression techniques, genetic algorithms, rule induction, clustering techniques and neural network techniques.

3. The computer implemented process of claim 1 wherein the data used by the interaction capturing technique consist essentially of the claim-based and enrollment-based risk factors, the claim amount is a standardized cost of services provided, and the model is configured to allocate prospective payments to health care providers.

4. The computer implemented process of claim 1 wherein the data used from the claims data consist essentially of the claim code for selected mandatory procedures, the claim amount is a standardized cost of services provided during the same time period as the base period, and the model is configured to evaluate the efficiency of health care providers.

5. The computer implemented process of claim 1, further comprising a computer implemented process of forecasting future claim amounts attributable to claims from people to be insured for an actual policy period, further comprising:
   storing in a computer readable memory historical health care claims data and enrollment data for a plurality of people for an underwriting period, where the underwriting period health care claims data comprise at least a claim code and a claim amount;
   programming a computer processor associated with the computer readable memory with the model comprising a combination of the selected base period risk factors and associated logical and mathematical operations;
   processing the actual underwriting period person-level data of each of the people to be insured to generate a person-level actual policy period cost forecast for each of the people to be insured;
   storing the costs forecasts for each of the people to be insured;
   programming a computer processor to total the person-level actual policy period costs forecasts for the plurality of people; and
   processing the person-level actual policy period cost forecasts to produce a group-level forecast for the actual underwriting period by totaling the person-level actual policy period cost forecasts.

6. The computer implemented process of claim 5, where person-level health care data claim amounts comprise a mix of fee for service payments and capitation payments, the base period and underwriting period risk factors are appended with dummy variables for the presence of capitation payments by provider type, and the cost estimate in the next period and actual policy period is a fee for service cost that must be supplemented with the capitation payments.

7. The computer implemented process of claim 5 for forecasting short term disability (STD) costs wherein a dependent measure for generating the cost forecasting model is the number of STD days in the policy period and is the dependent measure weighted by the expected cost per day for the STD to produce the person-level forecast STD costs and totaled across the plurality of people to produce the forecast STD cost.

8. The computer-implemented process of claim 5, further comprising:
   storing in a computer readable memory an expected health care cost inflation factor;
   programming a computer processor associated with the computer readable memory adjust the actual policy period forecasts by the expected health care cost inflation factor;
   processing with the computer processor to adjust the actual policy period forecasts by the expected health care cost inflation from the underwriting period to the actual policy period to provide an adjusted policy period forecasts;
   storing in a computer readable memory the adjusted policy period forecasts.

9. The computer implemented process of claim 1, wherein the cost forecast is produced for first-dollar health insurance.

10. The computer implemented process of claim 1, wherein the cost forecast produced is for aggregate-only stop loss health insurance.

11. The computer implemented process of claim 1, wherein the cost forecast produced is for specific stop loss health insurance.

12. The computer-implemented process of claim 11, where the dependant measure for generating the forecasting model is the probability of a person's total claims exceeding a specified threshold during the next period and that probability is weighted by the average amount that claims are above that threshold for all people in the development universe with claims above that threshold during the next period.

13. The computer implemented process of claim 1, wherein each of the claim-based risk factors is independent of the sequence in time of the other claim-based risk factors.

14. The computer implemented process of claim 1, for forecasting a probability of long term disability (LTD) claims wherein a dependent measure for generating the cost forecasting model is the probability of a LTD claim in the next period where the probability is weighted by the net present value of the LTD claim amount and comprises in addition producing person-level expected LTD costs and totaling person-level expected LTD costs across the plurality of people to produce an expected LTD cost.

15. The computer implemented process of claim 1 for forecasting group term life insurance costs wherein a dependent measure for generating the forecasting model is the expected probability of death weighted by the amount of life insurance to produce the person-level expected term life insurance cost which is totaled across the plurality of people to produce the expected term life insurance cost.

16. The computer implemented process of claim 1, wherein person-level claim amounts are a mix of fee for service payments and capitation payments so that the base period risk factors are appended to include dummy variables for the presence of capitation payments by provider type.

17. A computer-implemented process of forecasting a claim amount attributable to claims from members of a book of business during an actual policy period, comprising the steps of:
   storing in a computer readable memory person-level data, comprising enrollment data for members of a book of business to be insured for an actual underwriting period that is not contiguous with the actual policy period;
   storing in a computer readable memory a model development universe of person-level data, comprising enrollment data from the historical base period and historical next period heath care claims data for a plurality of individuals;
   storing in a computer readable memory enrollment-based risk factors for each historical base period member and next period claim amounts for each historical base period member;
   programming a computer processor associated with the computer readable memory with an interaction capturing technique;
   processing the risk factors with the computer processor to capture the predictive ability of main effects and interactions of the enrollment-based risk factors through the application of the interaction capturing technique to the model development universe;
   storing in the computer readable memory the predictive ability of the main effects and interactions of the enrollment-based risk factors;
   programming a computer processor associated with the compute readable memory to generate a person-level cost forecast by applying the predictive ability of the main effects and interactions of the enrollment-based risk factors;
   processing with the computer processor the person-level underwriting period enrollment data of each of the members of the book of business to generate a person-level expected cost forecast for the policy period for each member of the book of business;

storing in the computer readable memory the person-level costs forecasts;

programming a computer processor associated with the computer readable memory to total the person-level cost forecasts; and processing with the computer processor to total the person-level forecasts of each person of the group produce a group-level forecast for the expected cost of the policy period.

18. A computer-implemented process of forecasting costs attributable to claims from members of a book of business during an actual policy period, comprising the steps of:

storing in a computer readable memory person-level data, comprising enrollment data and actual underwriting period health care claims data, for members of a book of business, where the person-level data on a health care claim comprises at least a claim amount and a claim code and the actual underwriting period is not contiguous with the actual policy period;

storing in a computer readable memory a model development universe of person-level data, comprising enrollment data, historical base period health care claims data and historical next period claim data for a plurality of individuals, where the person-level data on a base period health care claim includes at least a claim amount and a claim code;

storing in a computer readable memory claim-based risk factors for each historical base period based on the claim code associated with the health care claim and providing at least one enrollment risk factor based on the enrollment data;

programming a computer processor associated with the computer readable memory with an interaction capturing technique;

processing the model development universe to develop a cost-forecasting model by capturing the predictive ability of main effects and interactions of risk factors through the application of the interaction capturing technique;

storing the cost forecasting model in the computer readable memory;

programming a computer processor associated with the computer readable memory to apply the cost-forecasting model to the person-level data of each of the individuals or members of a group to generate a person-level actual policy period expected cost forecast for each member of the group; and processing with the computer processor the person-level forecasts of each individual or member of the group to produce a group-level forecast for the actual policy period by totaling the person-level cost forecasts for the actual policy period.

19. The computer implemented process of claim 18 for forecasting short term disability costs wherein the interaction capturing technique uses a dependent measure from the next period and policy period comprising the number of STD days in the policy period and weights the dependent measure by the expected cost per day for the STD to produce the person-level expected STD costs and summed across the group to produce the group's expected STD cost.

20. The computer implemented process of claim 18, for forecasting a probability of long term disability (LTD) claims wherein a dependent measure for generating the cost forecasting model is the probability of a LTD claim in the policy period where the probability is weighted by the net present value of the LTD and applying the cost forecasting model to the person-level data produces person-level expected LTD costs wherein summing the person-level expected LTD costs across the group to produce a group's expected LTD cost for an actual policy period.

21. The computer implemented process of claim 18, wherein the cost forecast is produced for first-dollar health insurance.

22. The computer implemented process of claim 18, wherein the cost forecast is produced for specific plus aggregate stop loss health insurance.

23. The computer implemented process of claim 18, wherein the cost forecast produced is for aggregate-only stop loss health insurance.

24. The computer implemented process of claim 18, wherein the cost forecast produced is for specific stop loss health insurance.

25. The computer-implemented process of claim 24, where the dependant measure for generating the forecasting model is the probability of a person's total claims exceeding a specified threshold during the next period and that probability is weighted by the average amount that claims are above that threshold for all people in the development universe with claims above that threshold during the next period.

26. The computer implemented process of claim 18 for forecasting group term life insurance costs wherein a dependent measure for generating the cost forecasting model is the expected probability of death weighted by the amount of life insurance to produce the person-level expected term life insurance cost which is summed across the group to produce the group's expected term life insurance cost.

27. The computer implemented process of claim 18, wherein claim amounts are a mix of fee for service payments and capitation payments so that the base and underwriting periods risk factors are appended to include dummy variables for the presence of capitation payments by provider type and the cost estimate in the next and policy periods is the fee for service cost that must be supplemented with the capitation payments.

28. The process of claim 18 further comprising developing group-level cost-forecasting model for groups in the book of business by capturing the predictive ability of main effects and interactions of group-level risk factors which include groups historical claim amounts, group-level sum or average of the person-level forecasts, SIC code or industry type, characteristics of the benefit plan design, geographic locale, and number of people and length of time covered by the insurance through the application of an interaction capturing technique to the model development universe of groups.

29. The computer implemented process of claim 28, comprising in addition the step of: setting medical insurance reserves based on the group-level forecast, wherein the next period is a reserving period for claims that have not occurred or that have occurred but not been reported.

30. The computer implemented process of claim 28 for forecasting short term disability costs wherein the interaction capturing technique uses a group-level dependent measure of residual STD days at the group-level calculate forecast STD costs by weighting by the group's expected STD cost per day.

31. The computer implemented process of claim 28, wherein medical claim amounts are a mix of fee for service payments and capitation payments so that the base and underwriting periods group-level risk factors are appended to include dummy variables for the presence of capitation payments by provider type and the cost estimate in the next and policy periods is the fee for service cost that must be supplemented with the expected capitation payments.

32. The process of claim 18 comprising in addition the steps of:
   storing in the computer readable memory a provider type cost trend forecast adjustment to be utilized by at least one member of the group to be insured;
   programming a computer processor to adjust the person-level next period cost forecast for each member using the health care provider type with the provider type cost trend forecast adjustment.

33. An automated system for forecasting future costs attributable to claims from members of a book of business during an actual policy period comprising:
   a central processing unit;
   an insured person database, accessible by the processing unit, wherein the database comprises person-level enrollment data and actual underwriting period health care claims data, for members of a book of business to be insured, where the person-level data on a health care claim comprises at least a claim amount and a claim code;
   a model development universe database, accessible by the processing unit, where the second database comprises model development universe of person-level data, comprising enrollment data, historical base period health care claims data and historical next period claim amount data for a plurality of individuals, where the person-level data on the base period health care claim includes at least a claim amount and a claim code;
   a risk factor encoder, accessible by the processing unit, wherein the risk factor encoder encodes claim-based risk factors for each historical base period claim based on the claim code associated with the health care claim and the risk factor encoder encodes at least one enrollment risk factor based on the enrollment data;
   a model generator, accessible by the processing unit, that generates a cost-forecasting model by capturing the predictive capacity of the main effects and the interaction of the risk factors assigned by the risk factor encoder to forecast the historical next period of the model development universe data using the historical base period data;
   a person-level cost generator that applies the cost-forecasting model to the person-level actual underwriting period health care claims data of each of the members of the book of business to generate a person-level actual policy period claim amount forecast for each member of the book of business; and
   an actual policy period group-level cost forecast generator that totals the person-level actual next period forecasts for each member of the group to generate an actual policy period group-level cost forecast.

34. The system of claim 33 wherein the model generator captures the predictive ability of main effects and interactions of group-level risk factors which include but are not limited to groups historical claim amounts, group-level sum of the person-level forecasts, SIC code or industry type, characteristics of the benefit plan design, geographic locale, and the number of people and length of time covered by the insurance through the application of an interaction capturing technique to the model development universe of groups.

35. A computer-implemented system of forecasting costs attributable to claims from members of a book of business during an actual policy period, comprising:
   means for providing person-level data, comprising enrollment data and actual underwriting period health care claims data, for members of a book of business, where the person-level data on a health care claim comprises at least a claim amount and a claim code and the actual underwriting period is not contiguous with the actual policy period;
   means for providing a model development universe of person-level data, comprising enrollment data, historical base period health care claims data and historical next period claim amount data for a plurality of individuals, where the person-level data on a base period health care claim includes at least a claim amount and a claim code;
   means for providing claim-based risk factors for each historical base period based on the claim code associated with the health care claim and providing at least one enrollment risk factor based on the enrollment data;
   means for developing a cost-forecasting model by capturing the predictive ability of main effects and interactions of risk factors through the application of an interaction capturing technique to the model development universe;
   means for applying the cost-forecasting model to the person-level data of each of the individuals or members of a group to generate a person-level actual policy period expected cost forecast for each member of the group; and
   means for producing a group-level forecast for the actual policy period from the person-level forecasts of each individual or member of the group by totaling the person-level cost forecasts for the actual policy period.

36. The system recited in claim 35 wherein the system further is automated such that when actual underwriting period data is provided the system automatically provides an actual policy period claim amount forecast.

37. The system recited in claim 35 for use by a client having data and an Internet client application, further comprising an Internet server application such that when the client provides actual underwriting period data to the Internet server application, the Internet server application automatically provides an actual policy period claim amount forecast.

38. A method of underwriting a health insurance product comprising the steps of
   storing in a computer readable memory an identification of the coverage of the insurance product which identifies the conditions of payment under the product during a policy period;
   storing in a computer readable memory person-level health care claim information comprising enrollment data, and base period, next period and underwriting period claim data, the claim data comprising claim codes having associated claim costs;
   programming a computer processor associated with the computer readable memory with an interaction capturing technique;
   processing the person-level health care claim information with the interaction capturing technique to capture the predictive ability of the person-level health care claim and eligibility information;
   storing the captured predictive ability of the person-level health care claim information
   programming a computer processor to forecast a predicted cost of the insurance product; and
   processing with the computer processor the identification of the coverage of the insurance product and the captured predictive ability of the person-level health care claim and eligibility information to forecast a predicted cost of the insurance product during the policy period.

39. The method of underwriting an insurance product of claim 38, for insuring short term disability costs wherein the interaction capturing technique uses a dependent measure from the next period and policy period comprising the number of STD days in the policy period and weights the dependent measure by the expected cost per day for the STD to produce the person-level expected STD costs and summed across the group to produce the group's expected STD cost.

40. The method of underwriting a insurance product of claim 38, for insuring long term disability (LTD) claims wherein a dependent measure for generating predicted cost is the probability of a LTD claim in the policy period where the probability is weighted by the net present value of the LTD and applying the cost forecasting model to the person-level data produces person-level expected LTD costs wherein summing the person-level expected LTD costs across the group to produce a group's expected LTD cost for an actual policy period.

41. The method of underwriting a insurance product of claim 38, wherein the cost forecast is produced for first-dollar health insurance.

42. The method of underwriting a insurance product of claim 38, wherein the cost forecast is produced for stop loss health insurance.

43. The method of underwriting a insurance product of claim 38 wherein the cost forecast produced is for aggregate-only stop loss health insurance.

44. The method of underwriting a insurance product of claim 38 wherein the cost forecast produced is for specific stop loss health insurance.

45. The method of underwriting an insurance product of claim 44, where the dependant measure for generating the forecasting model is the probability of a person's total claims exceeding a specified threshold during the next period and that probability is weighted by the average amount that claims are above that threshold for all people in the development universe with claims above that threshold during the next period.

46. The method of underwriting a insurance product of claim 38 for insuring group term life insurance costs wherein a dependent measure for generating the cost forecasting model is the expected probability of death weighted by the amount of life insurance to produce the person-level expected term life insurance cost.

47. The method of underwriting a insurance product of claim 38 comprising renewal underwriting, wherein the person-level health care claim information further comprises claim data from the members of a group in the book of business to be insured.

* * * * *